United States Patent
Delcroix et al.

(10) Patent No.: US 11,264,044 B2
(45) Date of Patent: Mar. 1, 2022

(54) ACOUSTIC MODEL TRAINING METHOD, SPEECH RECOGNITION METHOD, ACOUSTIC MODEL TRAINING APPARATUS, SPEECH RECOGNITION APPARATUS, ACOUSTIC MODEL TRAINING PROGRAM, AND SPEECH RECOGNITION PROGRAM

(71) Applicant: NIPPON TELEGRAPH AND TELEPHONE CORPORATION, Chiyoda-ku (JP)

(72) Inventors: Marc Delcroix, Soraku-gun (JP); Keisuke Kinoshita, Soraku-gun (JP); Atsunori Ogawa, Soraku-gun (JP); Takuya Yoshioka, Soraku-gun (JP); Tomohiro Nakatani, Soraku-gun (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 768 days.

(21) Appl. No.: 16/074,367

(22) PCT Filed: Jan. 26, 2017

(86) PCT No.: PCT/JP2017/002740
§ 371 (c)(1),
(2) Date: Jul. 31, 2018

(87) PCT Pub. No.: WO2017/135148
PCT Pub. Date: Aug. 10, 2017

(65) Prior Publication Data
US 2021/0193161 A1    Jun. 24, 2021

(30) Foreign Application Priority Data
Feb. 2, 2016  (JP) .............................. JP2016-018016

(51) Int. Cl.
*G10L 21/0208* (2013.01)
*G10L 15/16* (2006.01)
*G10L 15/06* (2013.01)

(52) U.S. Cl.
CPC ........ *G10L 21/0208* (2013.01); *G10L 15/063* (2013.01); *G10L 15/16* (2013.01); *G10L 2021/02082* (2013.01)

(58) Field of Classification Search
CPC ................. G10L 21/0208; G10L 15/16; G10L 2021/0208
See application file for complete search history.

(56) References Cited

U.S. PATENT DOCUMENTS

2016/0247064 A1*  8/2016  Yoo .................... G06N 3/0445
2016/0260428 A1   9/2016  Matsuda et al.

FOREIGN PATENT DOCUMENTS

| JP | 2012-53218 A | 3/2012 |
| JP | 2015-102806 A | 6/2015 |

OTHER PUBLICATIONS

Kim et al., Environmental Noise Embeddins for Robust Speech Eecognition, Jan. 11, 2016, arXiv, whole document (Year: 2016).*

(Continued)

*Primary Examiner* — Sonia L Gay
(74) *Attorney, Agent, or Firm* — Oblon, McClelland, Maier & Neustadt, L.L.P.

(57) ABSTRACT

To begin with, an acoustic model training apparatus extracts speech features representing speech characteristics, and calculates an acoustic-condition feature representing a feature of an acoustic condition of the speech data using an acoustic-condition calculation model that is represented as a neural network, based on an acoustic-condition calculation model parameter characterizing the acoustic-condition calculation model. The acoustic model training apparatus then generates an adjusted parameter that is an acoustic model parameter (Continued)

adjusted based on the acoustic-condition feature, the acoustic model parameter characterizing an acoustic model represented as a neural network to which an output layer of the acoustic-condition calculation model is coupled. The acoustic model training apparatus then updates the acoustic model parameter based on the adjusted parameter and the speech features, and updates the acoustic-condition calculation model parameters based on the adjusted parameter and the speech features.

8 Claims, 14 Drawing Sheets

(56) References Cited

OTHER PUBLICATIONS

International Search Report dated Apr. 11, 2017, in PCT/JP2017/002740, filed Jan. 26, 2017.

Hinton, G. et al., "Deep Neural Networks for Acoustic Modeling in Speech Recognition, The shared views of four research groups", IEEE Signal Processing Magazine, vol. 29, No. 6, 2012, pp. 82-97.

Liao, H., "Speaker Adaptation of Context Dependent Deep Neural Networks", Proc. of ICASSP' 13, 2013, 5 pages.

Haykin, S., "Neural Networks: A Comprehensive Foundation", Prentice-Hall, $2^{nd}$ Edition, 1999, 10 pages.

Delcroix, M. et al., "Context Adaptive Deep Neural Networks for Fast Acoustic Model Adaptation", 2015 IEEE International Conference on Acoustic, Speech and Signal Processing, Apr. 2015, pp. 4535-4539.

Delcroix, M. et al., "Context Adaptive Deep Neural Networks for Fast Acoustic Model Adaptation in Noisy Conditions", 2016 IEEE International Conference on Acoustic, Speech and Signal Processing, Mar. 2016, pp. 5270-5274.

* cited by examiner

ACOUSTIC MODEL TRAINING METHOD, SPEECH RECOGNITION METHOD, ACOUSTIC MODEL TRAINING APPARATUS, SPEECH RECOGNITION APPARATUS, ACOUSTIC MODEL TRAINING PROGRAM, AND SPEECH RECOGNITION PROGRAM

FIELD

The present invention relates to an acoustic model training method, a speech recognition method, an acoustic model training apparatus, a speech recognition apparatus, an acoustic model training program, and a speech recognition program.

BACKGROUND

There has conventionally been a technology for recognizing a speech of a speaker from a sequence of speech data to be recognized, using an acoustic model trained with training speech data based on Hidden Markov Model (HMM) (see Non Patent Literature 1, for example).

Due to factors such as the presence of ambient noise and speaker variability, the features of the speech data to be recognized often do not match the features of speech data having been used in training. In other words, when the acoustic conditions of the speech data to be recognized do not match those of the training speech data, the speech recognition accuracy deteriorates. Some examples of the acoustic conditions include those of acoustic environment such as ambient noise, and speaker characteristics that are characteristics unique to the speakers. Speech recognition technologies are therefore required to have robustness against varying acoustic conditions. A known example of such a robust speech recognition technology is a training technology enabling the parameters of an acoustic model to be re-trained using data for adaptation so that the speech data to be recognized is better matched with the acoustic model (see Non Patent Literature 2, for example). Backward propagation of errors, for example, is widely used as the algorithm for the re-training of the parameters (see Non Patent Literature 3, for example).

CITATION LIST

Non Patent Literature

Non Patent Literature 1: G. Hinton et al., "Deep Neural Networks for Acoustic Modeling in Speech Recognition, The shared views of four research groups," IEEE SIGNAL PROCESSING MAGAZINE, Vol. 29, No. 6, pp. 82-97, 2012.
Non Patent Literature 2: H. Liao, "SPEAKER ADAPTATION OF CONTEXT DEPENDENT DEEP NEURAL NETWORKS," in Proc. of ICASSP' 13, 2013, pp. 7947-7951.
Non Patent Literature 3: S. Haykin, "NEURAL NETWORKS: A COMPREHENSIVE FOUNDATION," Prentice Hall PTR, Upper Saddle River, N.J., USA, 2nd edition, 1999.

SUMMARY

Technical Problem

However, the technology described above results in a mismatch between the acoustic model and the features of a speech to be recognized, because the acoustic conditions of the speech data used in the training and those of the speech data to be recognized are not necessarily the same. As a result, the accuracy of speech recognition deteriorates.

To suppress such a deterioration of the speech recognition accuracy, adaptations of the parameters of the acoustic model have been performed, using data for adaptation having similar acoustic conditions to those of the speech data to be recognized, for example. However, a large amount of speech data will be required to estimate a large number of parameters in the acoustic model accurately. Furthermore, a large amount of calculations has been required to adapt the parameters of the acoustic model to the observed speech data to be recognized, because each speech used in the parameter estimation is required to have some label (such as a speaker ID or a transcription) that is representative of the speech. Hence, fast adaptation of the parameters has been impossible, disadvantageously.

Addressing this issue, an object of one example of the embodiments disclosed herein is to enable fast and highly accurate adaptations of acoustic model parameters in the process of speech recognition.

Solution to Problem

To solve a problem and to achieve an object, an acoustic model training method comprises: a feature extraction step of extracting speech features representing speech characteristics; an acoustic-condition feature calculation step of calculating an acoustic-condition feature representing a feature of an acoustic condition of the speech data, using an acoustic-condition calculation model that is represented as a neural network, based on the speech features and an acoustic-condition calculation model parameter characterizing the acoustic-condition calculation model; an acoustic model parameter adjusting step of generating an adjusted parameter that is an acoustic model parameter adjusted based on the acoustic-condition feature, the acoustic model parameter characterizing an acoustic model that is represented as a neural network to which an output layer of the acoustic-condition calculation model is coupled; an acoustic model parameter updating step of updating the acoustic model parameter based on the adjusted parameter and the speech features; and an acoustic-condition calculation model parameter updating step of updating the acoustic-condition calculation model parameter based on the adjusted parameter and the speech features.

An acoustic model training apparatus comprises: an extracting unit that extracts speech features representing speech characteristics; an acoustic-condition feature calculating unit that calculates an acoustic-condition feature representing a feature of an acoustic condition of the speech data using an acoustic-condition calculation model that is represented as a neural network, based on the speech features and an acoustic-condition calculation model parameter characterizing the acoustic-condition calculation model; an acoustic model parameter adjusting unit that generates an adjusted parameter that is an acoustic model parameter based on the acoustic-condition feature, acoustic model parameter characterizing an acoustic model to which an output layer of the acoustic-condition calculation model is coupled; an acoustic model parameter updating unit that updates the acoustic model parameter based on the adjusted parameter and the speech features; and an acoustic-condition calculation model parameter updating unit that updates the acoustic-condition calculation model parameter based on the adjusted parameter and the speech features.

Advantageous Effects of Invention

According to one example of the embodiments disclosed herein, fast and accurate adaptations of acoustic model parameters become possible in the process of speech recognition.

DESCRIPTION OF EMBODIMENTS

Before explaining examples of an acoustic model training method, a speech recognition method, an acoustic model training apparatus, a speech recognition apparatus, an acoustic model training program, and a speech recognition program according to embodiments, some conventional technologies upon which the example of the embodiment stands will now be explained. Examples of the acoustic model training method, the speech recognition method, the acoustic model training apparatus, the speech recognition apparatus, the acoustic model training program, and the speech recognition program according to the embodiments will then be explained.

In the explanation hereunder, when A denotes a vector, for example, the vector will be referred to as a "vector A". When A denotes a matrix, for example, the matrix will be referred to as a "matrix A". When A denotes a scalar, for example, the scalar will be simply referred to as "A". When A denotes a set, for example, the set will be referred to as "set A". A function "f" of the vector A, for example, will be referred to as f(vector A). The denotation "^A" for A that is a vector, a matrix, or a scalar is equivalent of a denotation appended with "^" above "A". The denotation "-A" for A that is a vector, a matrix, or a scalar is equivalent of a denotation appended with "-" above "A". The denotation "~A" for A that is a vector, a matrix, or a scalar is equivalent of a denotation appended with "~" above "A". For A that is a vector or a matrix, the denotation $A^T$ represents a transpose of A.

<First Conventional Technology>

Figure 1:
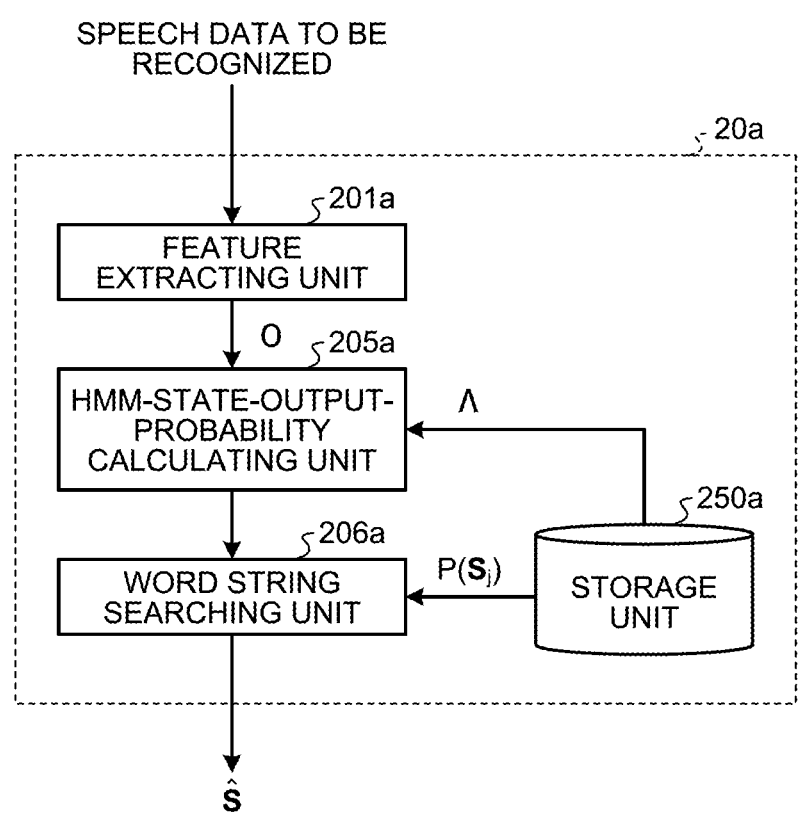
FIG. 1 is a schematic illustrating an example of a configuration of a speech recognition apparatus according to a first conventional technology.

A first conventional technology is a speech recognition technology disclosed in Literature 1 "G. Hinton et al., "Deep Neural Networks for Acoustic Modeling in Speech Recognition, The shared views of four research groups," IEEE SIGNAL PROCESSING MAGAZINE, Vol. 29, No. 6, pp. 82-97, 2012", for example. FIG. 1 is a schematic illustrating an example of a configuration of a speech recognition apparatus according to the first conventional technology. As illustrated in FIG. 1, this speech recognition apparatus 20a according to the first conventional technology includes a feature extracting unit 201a, an HMM-state-output-probability calculating unit 205a, and a word string searching unit 206a. The speech recognition apparatus 20a is connected to a storage unit 250a.

An acoustic model and a language model are stored in the storage unit 250a in advance. The acoustic model is a model of acoustic characteristics of speeches. The language model consists of a large number of symbol sequences such as phonemes and words. For example, a language model can be said to be a model of probabilities at which a word string is generated. Generally, the acoustic model for speech recognition is a left-to-right HMM of phonemes, and includes a distribution of output probabilities of the HMM states, the output probabilities being calculated by a neural network (NN).

In other words, the acoustic model stored in the storage unit 250a consists of parameters of the NN, such as the probabilities of HMM state transitions at each symbol such as a phoneme, a weighting matrix $W_i$ and a bias vector $b_i$ relevant to the $i^{th}$ hidden layer, and parameters of an activation function. "i" is the index of a hidden layer. These parameters are referred to as acoustic model parameters, and a set of these parameters are denoted as $\Lambda=\{W_1, b_1, \ldots, W_I, b_I\}$ (where I is a number resultant of adding one to the total number of hidden layers, that is, the sum of the number of hidden layers and the output layer). The language model consists of a large number of symbol sequences $S_j$ such as phonemes or words, and $P(S_j)$ is a probability of a symbol sequence $S_j$ (language probability) being acquired from the language model. The symbol sequence $S_j$ is a sequence of symbols, such as a phonemes or words, and may be a result of speech recognition.

The feature extracting unit 201a reads a sequence of speech data to be recognized, and extracts features of the speech from the speech data to be recognized. Examples of the features include a Mel-frequency cepstral coefficient (MFCC), log Mel-filterbank coefficients (LMFC), ΔMFCC (a first derivative of the MFCC), ΔΔMFCC (a second derivative of the MFCC), a logarithm (spectrum) power, and a Δlogarithmic power (a first derivative of the logarithmic power).

The feature extracting unit 201a then concatenates the feature acquired from one frame to the features acquired from consecutive frames, e.g., five frames previous to and five frames subsequent to the frame, and generates a time-sequence feature vector on (where n is a natural number within a range 1, . . . , N) that is 10 to 2000 dimensional or so. The feature extracting unit 201a then generates a feature O that is an ensemble of time-sequence feature vectors on for all of the frames, as expressed as Equation (1) below. The feature O is an ensemble of D dimensional vectors covering the first to the $N^{th}$ frames. The frame length is, for example, 30 milliseconds or so, and the frame shift length is 10 milliseconds or so.

$$O = \{o_1, o_2, \ldots, o_N | o_n \in R^D\} \quad (1)$$

Figure 2:
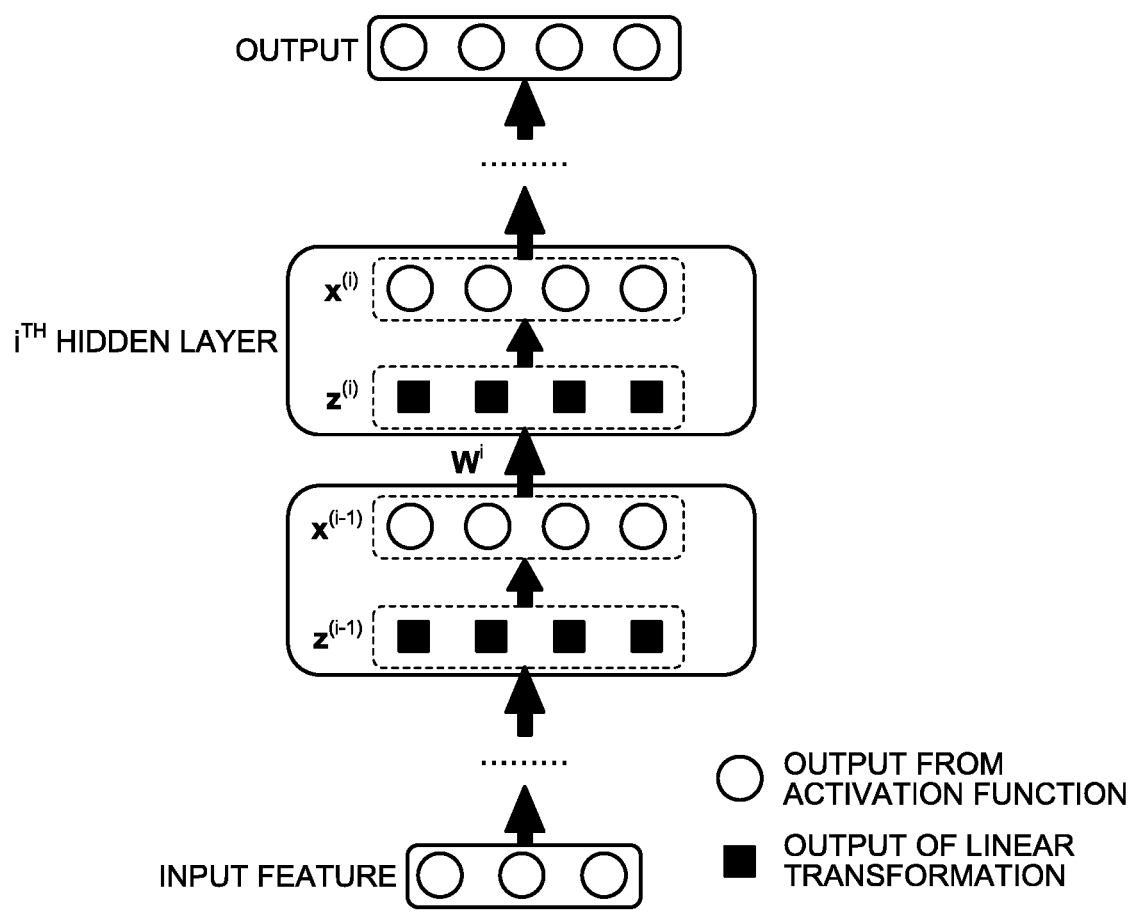
FIG. 2 is a schematic generally illustrating an example of a process according to the first conventional technology.

The HMM-state-output-probability calculating unit 205a reads the acoustic model parameters Λ from the storage unit 250a, and calculates the output probabilities of the HMM states of the acoustic model, for each of the frames n in the feature vector O, based on the read acoustic model parameters Λ. Such HMM state output probabilities are output from the neural network, as indicated by Equation (2) in the Literature 1, "G. Hinton et al., "Deep Neural Networks for Acoustic Modeling in Speech Recognition, The shared views of four research groups," IEEE SIGNAL PROCESSING MAGAZINE, Vol. 29, No. 6, pp. 82-97, 2012", for example. FIG. 2 is a schematic generally illustrating an example of a process according to the first conventional technology. As illustrated in FIG. 2, a neural network representing an acoustic model for speech recognition according to the conventional technology has one or more hidden layers between the input and the output. An input to the neural network is the time-sequence feature vector on, and is input to the first hidden layer. The outputs from the neural network are the output probabilities of the HMM states, output from the last hidden layer. The calculations performed by the HMM-state-output-probability calculating unit 205a in each of such hidden layers include two processes. One of the processes is a process using linear transformation, and the other is a process using the activation function. The linear transformation executed in each layer is as expressed as Equation (2) below.

$$z_{i,n} = W_i x_{i-1,n} + b_i \quad (2)$$

In Equation (2), the vector $z_{i,n}$ is the output of the linear transformation in the $i^{th}$ hidden layer (where "i" is a natural number i=1, 2, . . . , I (where I is a number resultant of adding one to the total number of hidden layers, that is, the sum of the number of the hidden layers and the number of the output layer)), and the vector $x_{i-1,n}$ is the output from the $(i-1)^{th}$ hidden layer. The vector $x_{0,n}$ is the time-sequence feature vector on that is input to the neural network. The output of the activation function is as indicated in Equation (3) below.

$$x_{i,n} = \sigma(z_{i,n}) \quad (3)$$

In Equation (3), the vector $x_{i,n}$ is the output from the $i^{th}$ hidden layer. σ is the activation function, such as a sigmoid function, and is applied to each element of σ(vector $z_{i,n}$) vector. In other words, in the $i^{th}$ hidden layer, the HMM-state-output-probability calculating unit 205a outputs the vector $x_{i,n}$ that is the result of applying the process of Equation (2) to the vector $z_{i,n}$ that is the result of applying the linear transformation of Equation (3) to the vector $x_{i-1,1}$ that is output from the $(i-1)^{th}$ hidden layer, which is the previous hidden layer. The HMM-state-output-probability calculating unit 205a then calculates the output probabilities of the HMM states in the acoustic model, for each of the frame n included in the feature vector O, based on the vectors $x_{i,n}$ (i=1, 2, . . . , I).

Based on the output probabilities of the HMM states, the output probabilities being calculated by the HMM-state-output-probability calculating unit 205a, the word string searching unit 206a generates J candidate symbol sequences $S_j$ (where J is a natural number), and calculates an acoustic score for each of the candidate symbol sequences $S_j$. The acoustic score represents a likelihood of the candidate symbol sequence $S_j$ matching the acoustic model. The symbols are, for example, phonemes, and j=1, 2, . . . , J. The word string searching unit 206a then calculates a language score for each of the candidate symbol sequences $S_j$ based on the language model read from the storage unit 250a. The language score represents a likelihood of the candidate symbol sequence $S_j$ matching the language model. The word string searching unit 206a then searches the J candidate symbol sequences $S_j$ for a word string that is most likely to match the speech data to be recognized, that is, a candidate symbol sequence with a highest score by integrating the acoustic score and the language score, based on the calculated acoustic score and the language score, from the language model stored in the storage unit 250a. The word string searching unit 206a then outputs the searched candidate symbol sequence as a word string ˆS that is the recognition result.

Figure 3:
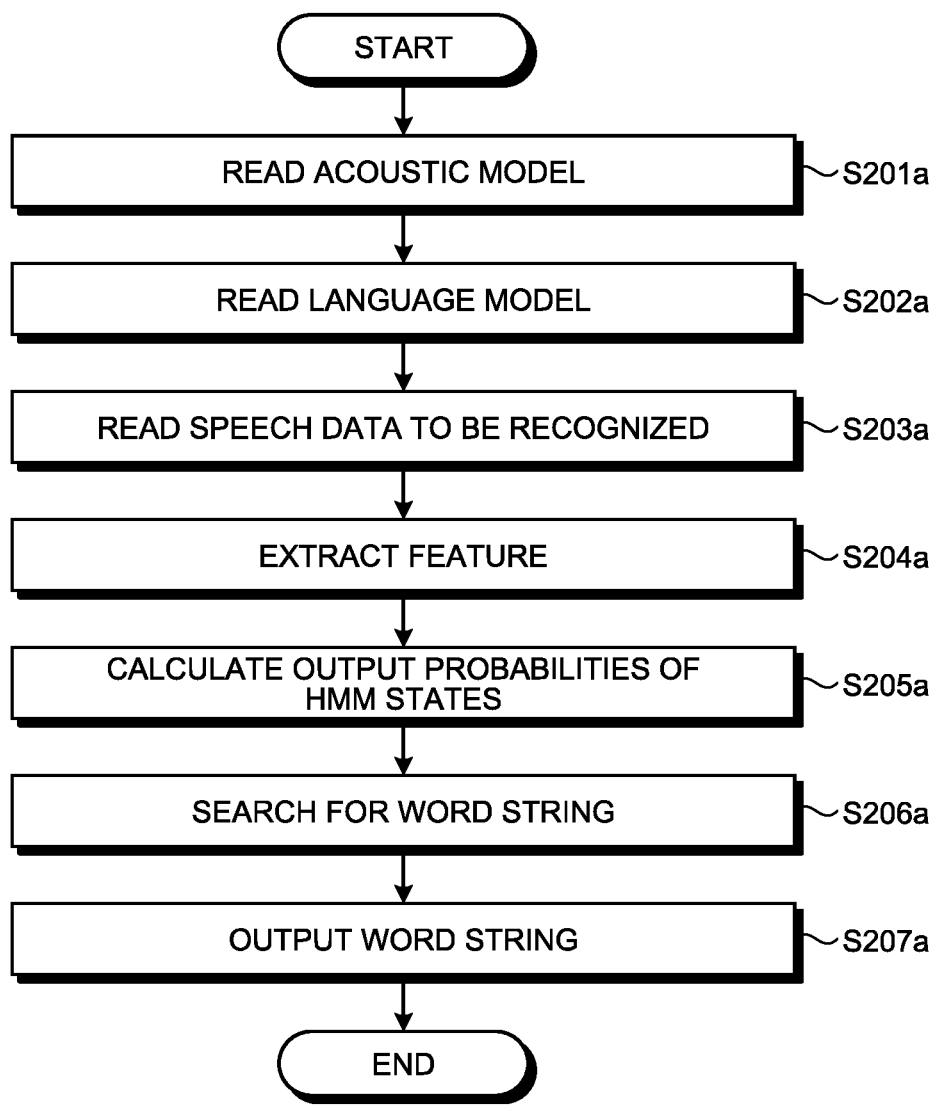
FIG. 3 is a flowchart illustrating an example of a speech recognition process according to the first conventional technology.

FIG. 3 is a flowchart illustrating an example of a speech recognition process according to the first conventional technology. To begin with, the speech recognition apparatus 20a reads the acoustic model parameters Λ from the storage unit 250a (Step S201a). The speech recognition apparatus 20a then reads the language model from the storage unit 250a (Step S202a). The speech recognition apparatus 20a then reads a sequence of speech data to be recognized (Step S203a). The speech recognition apparatus 20a then extracts speech features from the read speech data to be recognized, and generates a feature vector O (Step S204a). The speech recognition apparatus 20a then calculates the output probabilities of the HMM states of the acoustic model, for each of the frames n included in the feature vector O, based on the read acoustic model parameters Λ (Step S205a). The speech recognition apparatus 20a then generates candidate symbol sequences $S_j$ based on the output probabilities of the HMM states, the output probabilities having been calculated by the HMM-state-output-probability calculating unit 205a. The speech recognition apparatus 20a searches the language model stored in the storage unit 250a for a candidate symbol sequence $S_j$ having a highest score by integrating the acoustic score and the language score of each of the candidate symbol sequences $S_j$ (Step S206a). The speech recognition apparatus 20a then outputs the result of search performed at Step S206a as a word string ˆS that is a recognition result (Step S207a).

<Second Conventional Technology>

Generally speaking, because acoustic conditions such as acoustic environment and speaker characteristics at the time of training the acoustic model and at the time of speech recognition differ, the speech recognition according to the first conventional technology is incapable of achieving sufficient recognition performance, because the features of the acoustic model do not match the features at the time of recognition. A technology for addressing this issue is a second conventional technology for performing speech recognition by adjusting (re-training) the parameters of the acoustic model (hereinafter, referred to as acoustic model adjusting) in such a manner that the parameters of the acoustic model are matched with the speech features at the time of recognition. An example of the second conventional technology is the speech recognition technology disclosed in Literature 2, "H. Liao, "SPEAKER ADAPTATION OF CONTEXT DEPENDENT DEEP NEURAL NETWORKS," in Proc. of ICASSP' 13, 2013, pp. 7947-7951". The second conventional technology performing the acoustic model adjusting will now be explained, for the parts that are different from those according to the first conventional technology.

Figure 4:
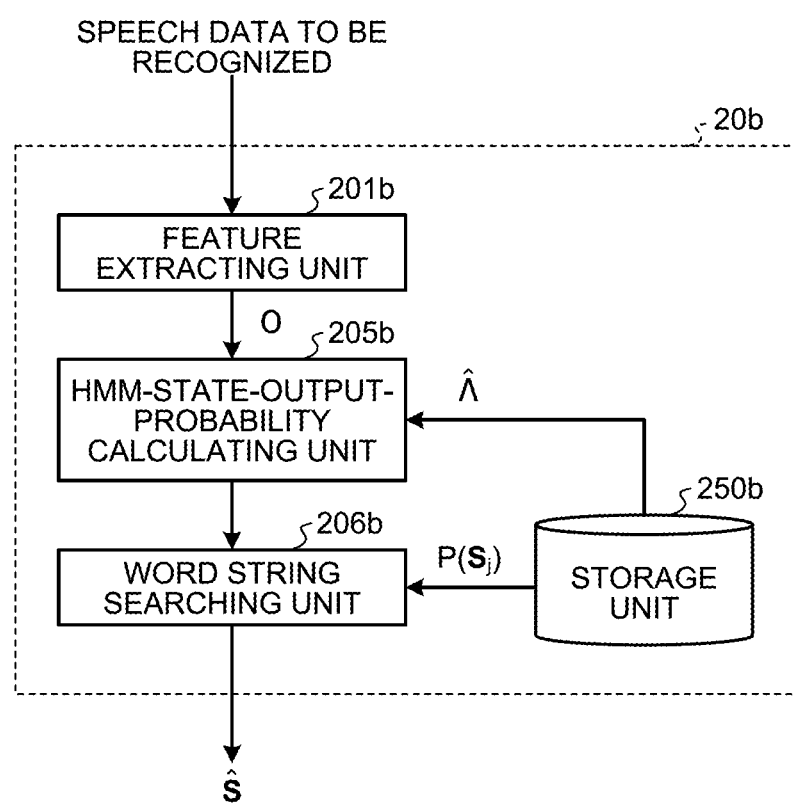
FIG. 4 is a schematic illustrating an example of a configuration of a speech recognition apparatus according to a second conventional technology.

FIG. 4 is a schematic illustrating an example of a configuration of a speech recognition apparatus according to the second conventional technology. A speech recognition apparatus 20b according to the second conventional technology performing the acoustic model adjusting includes a feature extracting unit 201b, an HMM-state-output-probability calculating unit 205b, and a word string searching unit 206b. The speech recognition apparatus 20b is connected to a storage unit 250b.

The storage unit 250b is the same as the storage unit 250a according to the first conventional technology, except that the storage unit 250b stores therein adjusted acoustic model parameters for the acoustic model that is stored therein. The feature extracting unit 201b reads a sequence of speech data to be recognized, and generates a feature vector O. The HMM-state-output-probability calculating unit 205b calculates the HMM state output probability, based on the acoustic model parameters $\hat{\Lambda}$ having been adjusted in advance and the feature vector O generated by the feature extracting unit 201b. The word string searching unit 206b receives the output probabilities of the HMM states, and the language model that is read from the storage unit 250b as inputs, and outputs a word string $\hat{S}$ that is the recognition result.

Figure 5:
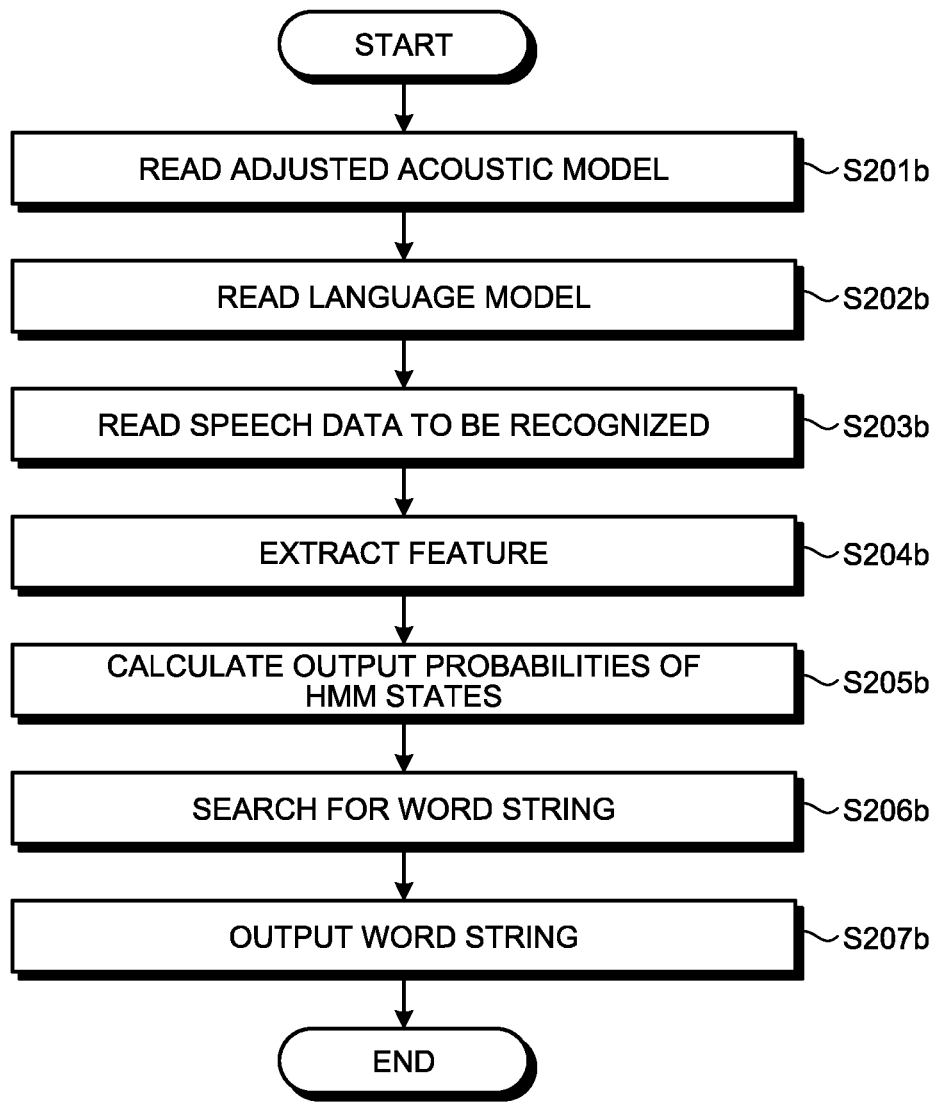
FIG. 5 is a flowchart illustrating an example of a speech recognition process according to the second conventional technology.

FIG. 5 is a flowchart illustrating an example of a speech recognition process according to the second conventional technology. As illustrated in FIG. 5, comparing with the speech recognition apparatus 20a according to the first conventional technology, the specific process performed by the speech recognition apparatus 20b is the same as that performed by the speech recognition apparatus 20a according to the first conventional technology, except that the acoustic model read at Step S201b is the adjusted acoustic model.

<Third Conventional Technology>

Figure 6:
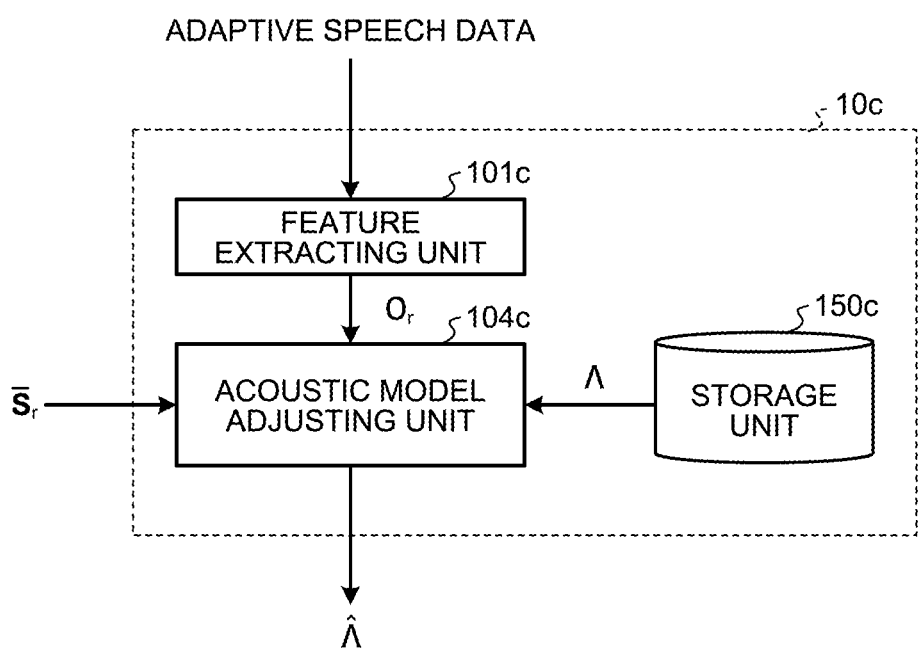
FIG. 6 is a schematic illustrating an example of a configuration of an acoustic model retraining apparatus according to a third conventional technology.

An example in which an acoustic model retraining apparatus 10c having an acoustic model adjusting (re-training) function according to a third conventional technology is applied to the speech recognition apparatus 20b according to the second conventional technology will now be explained. FIG. 6 is a schematic illustrating an example of a configuration of the acoustic model retraining apparatus according to the third conventional technology. The acoustic model retraining apparatus 10c includes a feature extracting unit 101c and an acoustic model adjusting unit 104c. The acoustic model retraining apparatus 10c is connected to a storage unit 150c.

The storage unit 150c stores therein only the acoustic model parameters $\Lambda$, without storing therein the language model. The feature extracting unit 101c reads a sequence of speech data for adaptation, and generates a feature vector $O_r$. The feature extracting unit 101c performs the same process as that performed by the feature extracting unit 201b included in the speech recognition apparatus 20b.

The acoustic model retraining apparatus 10c calculates the adjusted acoustic model parameters $\hat{\Lambda}$ by adjusting the acoustic model parameters $\Lambda$ using the speech data for adaptation having the same acoustic conditions as the speech data for recognition, and a label related to the speech data for adaptation. The label may be a manual (supervised) transcription, or an automatic (unsupervised) transcription resultant of recognizing the speech using the first or the second conventional technology. Adjusting of the acoustic model parameters $\Lambda$ using a supervised label is referred to as a supervised adaptation. Adjusting of the acoustic model parameters $\Lambda$ using an unsupervised label will be referred to as unsupervised adaptation. Hereinafter, the label will be denoted as $-S_r$.

The acoustic model adjusting unit 104c adjusts (re-trains) the acoustic model parameters $\Lambda$ using the acoustic model parameters $\Lambda$ read from the storage unit 150c, the feature vector $O_r$ generated by the feature extracting unit 101c, and the input label $-S_r$. Specifically, the acoustic model adjusting unit 104c re-trains the acoustic model parameters $\hat{\Lambda}$, using the data for adaptation (the feature vector $O_r$ of the speech data for adaptation), and based on a symbol sequence $S_r$ that is the reference corresponding to the feature vector $O_r$, in such a manner that an objective function FA in Equation (4) below is maximized. The re-trained acoustic model parameters $\hat{\Lambda}$ are then used by the HMM-state-output-probability calculating unit 205b included in the speech recognition apparatus 20b according to the second conventional technology, for example (see FIG. 4).

$$\hat{\Lambda} = \underset{\Lambda}{\mathrm{argmax}} F_\Lambda(O, S_r) \quad (4)$$

The acoustic model used by the acoustic model adjusting unit 104c is a NN. Generally, cross entropy is used as the objective function $F_\Lambda$, for example. The optimization problem in Equation (4) is solved using stochastic gradient descent (SGD), for example, and therefore, the derivative of the adjusted parameters can be calculated using an error backpropagation algorithm, as disclosed in Literature 3, "S. Haykin, "NEURAL NETWORKS: A COMPREHENSIVE FOUNDATION," Prentice Hall PTR, Upper Saddle River, N.J., USA, 2nd edition, 1999". In such a case, as a learning rate that is a variable of the SGD, a small value, such as 0.0001, is often used.

Figure 7:
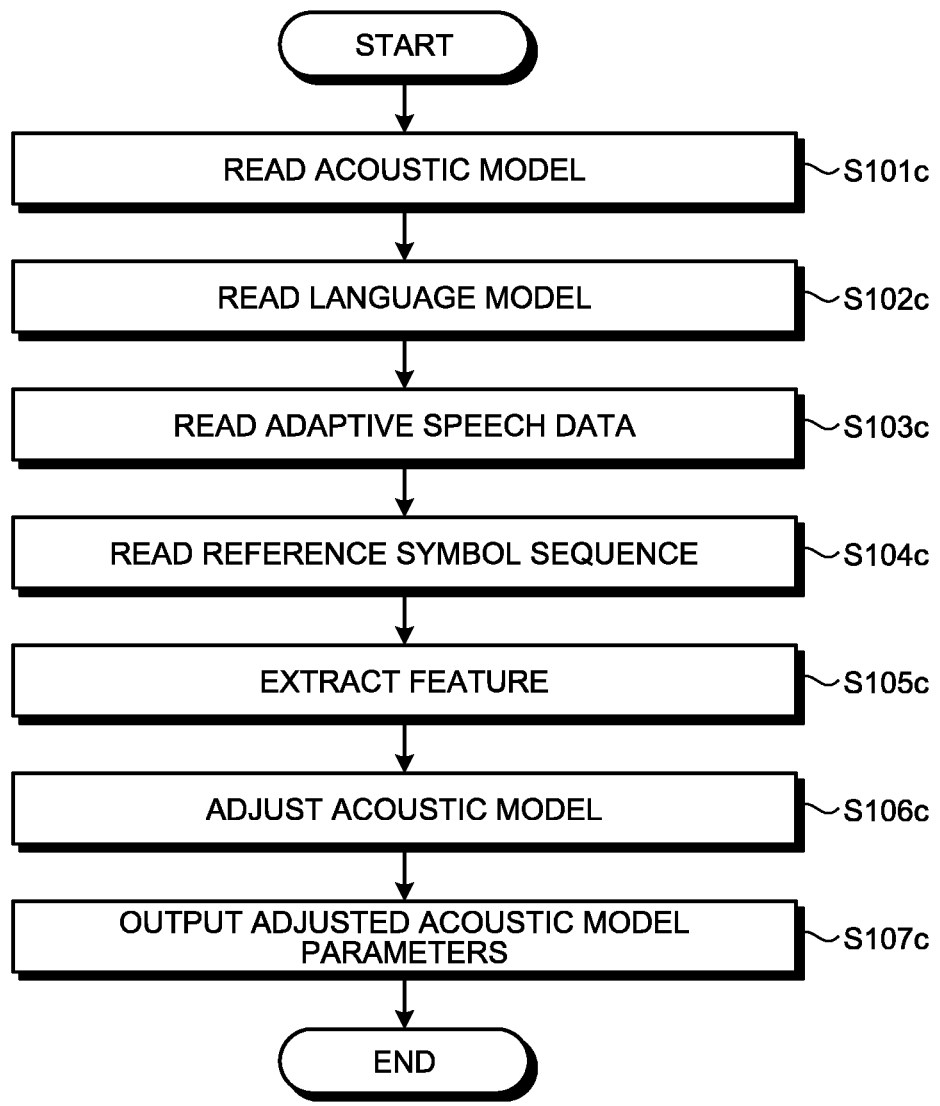
FIG. 7 is a flowchart illustrating an example of an acoustic model retraining process according to the third conventional technology.

FIG. 7 is a flowchart illustrating an example of an acoustic model retraining process according to the third conventional technology. To begin with, the acoustic model retraining apparatus 10c reads the acoustic model parameters $\Lambda$ from the storage unit 150c (Step S101c). The acoustic model retraining apparatus 10c then reads a language model from a storage unit not illustrated, e.g., the storage unit 250b in the speech recognition apparatus 20b (see FIG. 4) (Step S102c). The acoustic model retraining apparatus 10c then reads a sequence of speech data for adaptation (Step S103c). The acoustic model retraining apparatus 10c then reads the reference symbol sequence $S_r$ (Step S104c). The acoustic model retraining apparatus 10c then extracts features from the speech data for adaptation, and generates a feature vector $O_r$ (Step S105c). The acoustic model retraining apparatus 10c then corrects (re-trains) the acoustic model parameters $\Lambda$ using the feature vector $O_r$ and the input label $-S_r$ (Step S106c) The acoustic model retraining apparatus 10c re-trains the acoustic model parameters $\hat{\Lambda}$ that are the adjusted acoustic model parameters $\Lambda$, and outputs the acoustic model parameters $\hat{\Lambda}$ (Step S107c).

Embodiment

The acoustic model training method, the speech recognition method, the acoustic model training apparatus, the speech recognition apparatus, the acoustic model training program, and the speech recognition program according to an embodiment disclosed herein will now be explained. The following embodiment is merely one example, and is not intended to limit the scope of the technology disclosed herein in any way. The embodiment described below and any other embodiment may be combined as appropriate, within the scope such a combination is not contradictory.

<Mathematical Background of Embodiment>

In Literature 4, "M. Delcroix, K. Kinoshita, T. Hori, T. Nakatani, "Context adaptive deep neural networks for fast acoustic model adaptation," in Proc. IEEE International Conference on Acoustics, Speech and Signal Processing (ICASSP), 2015, pp. 4535-4539, 2015", a context adaptive deep neural network (CADNN), which is an acoustic model that learns parameters in a manner associated with the acoustic-condition features, is disclosed.

The acoustic model parameters of the CADNN are associated with acoustic-condition features that are given from external, and change depending on the features. To begin with, in the training of the CADNN, the CADNN learns acoustic model parameters corresponding to acoustic conditions, using speech features and acoustic-condition features. When a speech is to be recognized, the CADNN calculates acoustic-condition features of the speech that is the target of recognition, and estimates and determines new acoustic model parameters that are suitable for the acoustic conditions, based on the acoustic-condition features and the acoustic model parameters having learned in advance.

At this time, because the acoustic-condition features can be calculated without using any label (a speaker ID or a transcription), using a small amount of speech data (only a few or so), advantageously, fast adaptation of the acoustic model is possible. However, because the acoustic-condition feature calculating unit used in the CADNN has been designed independently from a speech recognition apparatus, and has not been designed from the criteria for optimizing the speech recognition performance, the CADNN has difficulty in performing speech recognition highly accurately using the conventional acoustic-condition features.

To address this issue, in the present embodiment, a context adaptive deep neural network with joint training (CADNN-JT), which is an acoustic model with improvements in the shortcomings of the CADNN described above, will be used. With the CADNN-JT, it is possible to optimize the parameters of a model for calculating the acoustic-condition features, and the parameters of the acoustic model at the same time. The CADNN-JT includes an acoustic-condition feature calculation model represented as a neural network, for example, and the output layer of the neural network is coupled to a part of the neural network of the conventional CADNN. In this manner, the entire neural network including the acoustic-condition feature calculation model can be optimized simultaneously based on the criteria for optimizing speech recognition, so that the speech recognition accuracy is also improved. The CADNN-JT will now be explained.

(Overview of CADNN)

Figure 8:
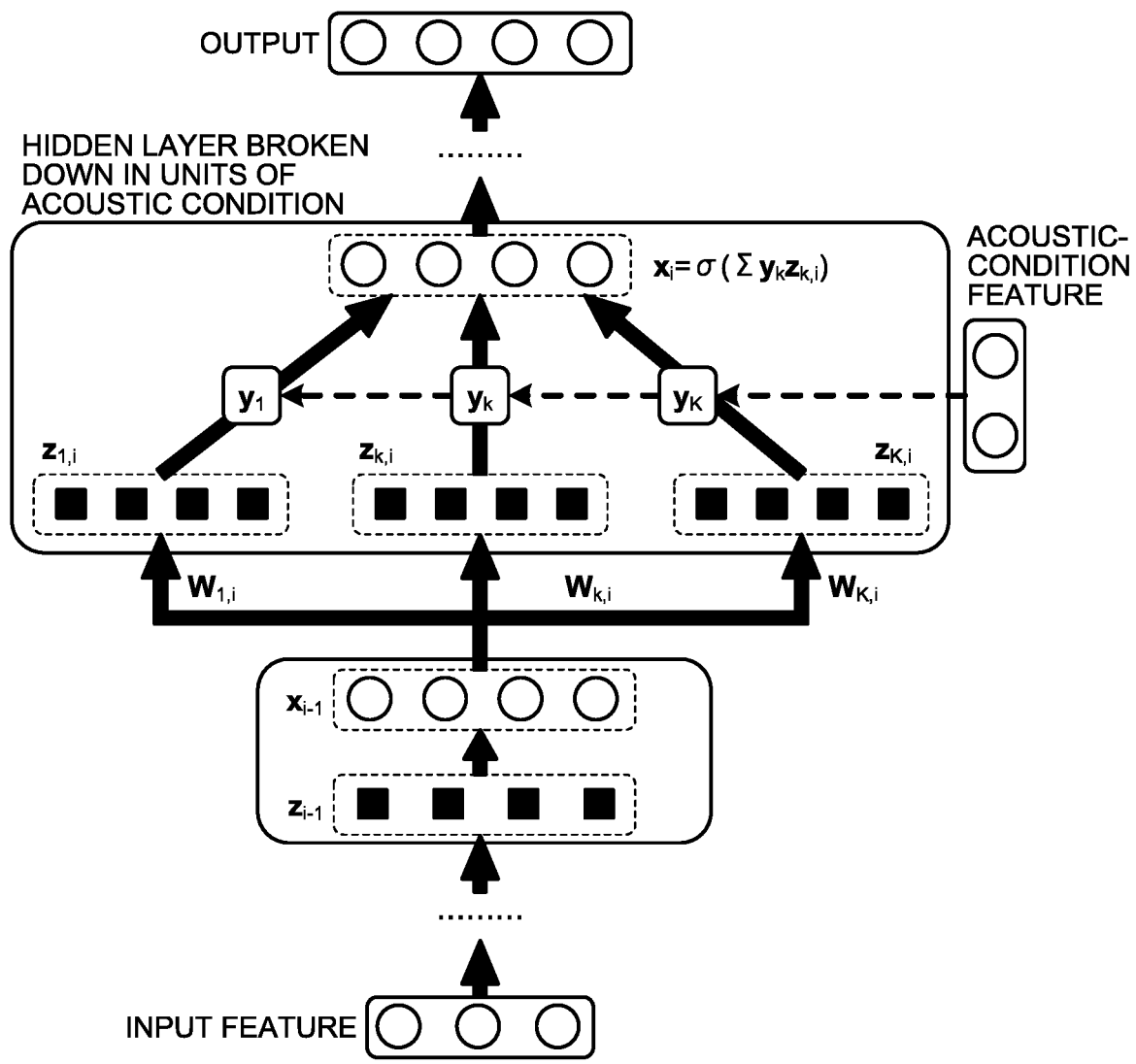
FIG. 8 is a schematic generally illustrating an example of a conventional acoustic-condition adaptive acoustic model.

FIG. 8 is a schematic generally illustrating an example of the conventional acoustic-condition adaptive acoustic model. In the CADNN, which is the conventional acoustic-condition adaptive acoustic model, as illustrated in FIG. 8, a hidden layer in the NN is factorized into units of each element of a vector representing an acoustic-condition feature (hereinafter, referred to as an "acoustic-condition feature vector"). In FIG. 8, as an example, one hidden layer ($i^{th}$ hidden layer) is factorized, but at least one hidden layer may be factorized, or each one of the hidden layers may be factorized. The output from the linear transformation in the -factorized hidden layer is calculated as expressed in Equation (5) below.

$$z_{i,n} = \sum_{k}^{K} y_{k,n}(W_{i,k}x_{i-l,n} + b_{i,k}) \quad (5)$$

$y_{k,n}$ in Equation (5) represents the $k^{th}$ element (where k is a natural number 1, 2, ..., K, and K is a natural number representing the number of acoustic conditions) in an acoustic-condition feature vector $y_n \in R^K$ (K dimensional real-number space) extracted from the $n^{th}$ frame, as will be described later in detail, and will be referred to as an acoustic-condition feature $y_{k,n}$, hereinafter. A weighting matrix $W_{i,k}$ in Equation (5) above is a linear transformation matrix for the acoustic-condition feature $y_{k,n}$ in the $i^{th}$ hidden layer. The bias vector $b_{i,k}$ in Equation (5) above is a bias vector relevant to the acoustic-condition feature $y_{k,n}$ in the $i^{th}$ hidden layer. In this manner, in the CADNN, a hidden layer is represented as factorized into K acoustic condition elements. The factorization of the hidden layer, being factorized correspondingly to each acoustic-condition feature, may be as expressed as Equation (6) or Equation (7) below.

$$z_{i,n} = \left(\sum_{k}^{K} y_{k,n} W_{i,k} x_{i-l,n}\right) + b_i \quad (6)$$

$$z_{i,n} = W_i x_{i-l,n} + \sum_{k}^{K} y_{k,n} b_{i,k} \quad (7)$$

The acoustic model parameters used in the speech recognition are calculated as Equation (8-1) and Equation (8-2) below, and the acoustic model parameters are adapted automatically to the acoustic conditions, based on the acoustic-condition feature $y_{k,n}$, at the time of speech recognition.

$$\begin{cases} \hat{W}_{i,n} = \sum_{k}^{K} y_{k,n} W_{i,k} & (8\text{-}1) \\ \hat{b}_{i,n} = \sum_{k}^{K} y_{k,n} b_{i,k} & (8\text{-}2) \end{cases}$$

The acoustic-condition feature $y_{k,n}$ represents an acoustic condition. In the CADNN, the acoustic-condition feature $y_{k,n}$ has been calculated in a system that is independent from the speech recognition apparatus. For example, in the case of speaker adaptations, it has been possible to learn a model corresponding to each speaker class by dividing the training speech data into those of each speaker class (see Literature 5, "N. Dehak et al., "Front-End Factor Analysis for Speaker Verification," IEEE Trans. Audio, Speech, Language Process., Vol. 19, No. 4, pp. 788-798, 2011"). In the CADNN, for each test utterance, a posterior probability for each speaker class has been calculated using a model corresponding to each speaker class, and the posterior probability is used as $y_{k,n}$.

(Overview of CADNN-JT)

Figure 9:
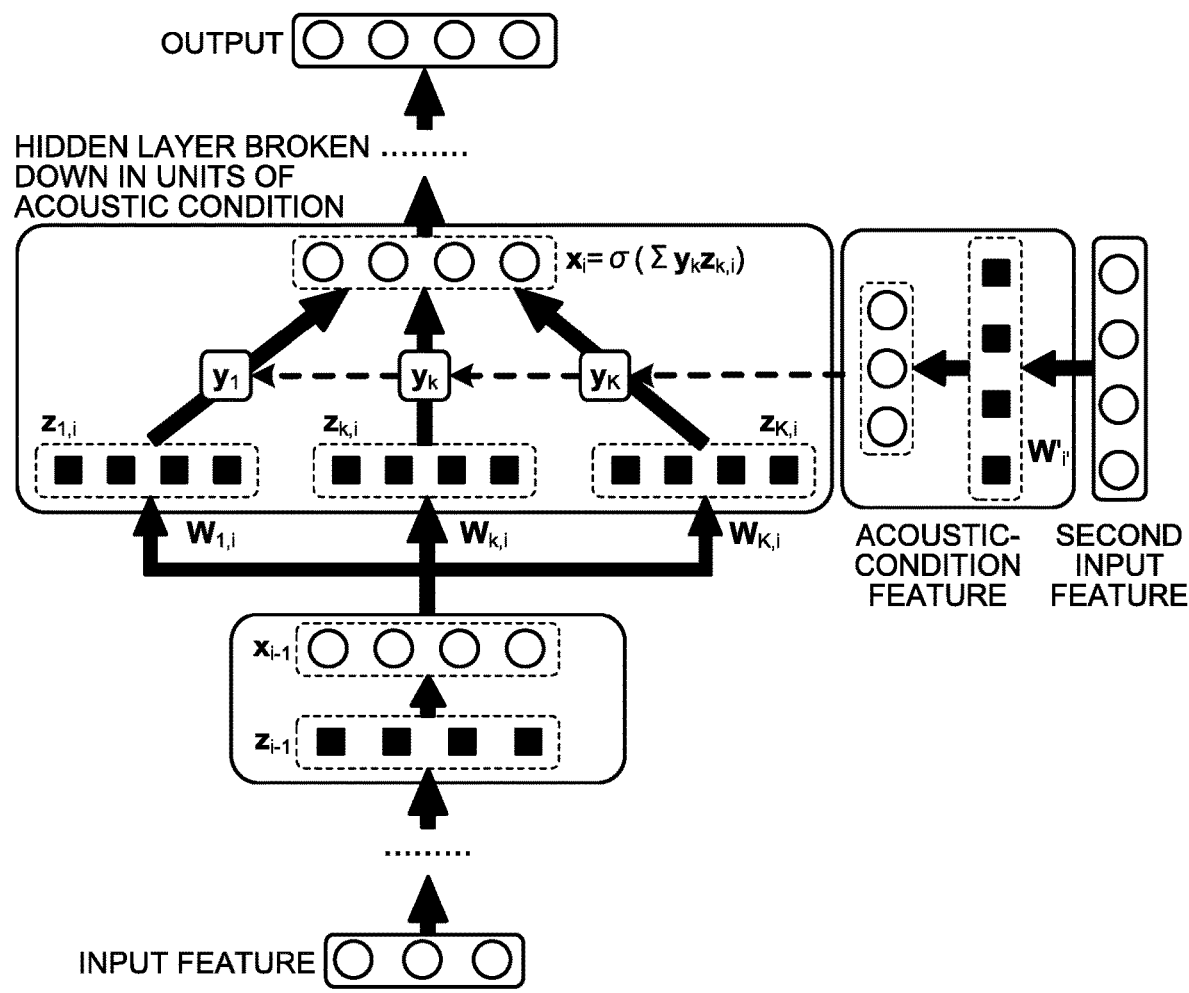
FIG. 9 is a schematic generally illustrating an example of an acoustic-condition adaptive acoustic model according to an embodiment.

FIG. 9 is a schematic generally illustrating an example of an acoustic-condition adaptive acoustic model according to the present embodiment. As illustrated in FIG. 9, in the CADNN-JT, which is the acoustic-condition adaptive acoustic model according to the present embodiment, a neural network is used as a model for calculating the acoustic-condition features representing acoustic conditions, and the parameters of the neural network are optimized at the same time as the parameters of the conventional CADNN are optimized. In other words, the acoustic model and the acoustic-condition calculation model are represented as neural networks having one or more hidden layers, and the output layer of the acoustic-condition calculation model is coupled to the acoustic model.

As the input to the acoustic-condition feature calculation model, second input features un is used. The vector $u_n$ may be i-vector representing a speaker feature that is often used in the speaker recognition or the like, or speech features $O_n$. The second input features $u_n$ may be the same as or different from the input feature. The acoustic-condition feature $y_{k,n}$ calculated by the acoustic-condition feature calculation model is calculated as Equation (9) below.

$$y_n = f(u_n, \Omega) \qquad (9)$$

The vector $y_n = [y_{1,n}, \ldots, y_{k,n}, \ldots, y_{K,n}]$ is a K dimensional acoustic-condition feature vector. The vector $u_n = [u_{1,n}, \ldots, u_{J,n}]$ is a J dimensional second input feature. The function f( ) is a function for calculating the acoustic-condition features, and f is a parameter of the function f( ). Explained herein is an example in which f( ) is a deep neural network (DNN), but f( ) may be a recurrent neural network (RNN) or a convolutional neural network (CNN).

When f( ) is the DNN, the parameters $\Omega = \{W'_{i'}, b'_{i'}, i', \ldots, I'\}$ will be a parameter for performing linear transformation, such as that indicated as Equation (2) above, in each layer of the neural network. $W'_{i'}$ is a transformation matrix, $b'_{i'}$ is a bias vector, and I' is a number resultant of adding one to the total number of hidden layers in the neural network serving as the acoustic-condition feature calculation model, that is, the sum of the number of the hidden layers and the number of the output layer. As the activation function of the hidden layer, a sigmoid function, for example, may be used. As the activation function of the output layer, a softmax function or a linear function, for example, may be used.

By using a posterior probability of a speaker class as the acoustic-condition feature $y_{k,n}$, each speaker can be represented as an acoustic condition. By using a posterior probability of a noise environment class as an acoustic-condition feature $y_{k,n}$, a noise environment can be represented as an acoustic condition. Furthermore, because $y_{k,n}$ is basically a feature that can be calculated from only a few seconds of speech data, a large amount of acoustic model parameters ($W_i$, $b_i$) can be adapted to the acoustic conditions by using only a few seconds of speech data.

An output from each hidden layer is calculated as expressed in Equation (10), by applying the activation function to the vector $z_{i,n}$ output from the linear transformation.

$$x_{i,n} = \sigma(z_{i,n}) \qquad (10)$$

The weighting matrix $W_{i,k}$ and the bias vector $b_{i,k}$, which are the parameters of the linear transformation corresponding to each hidden layer factorized in units of each acoustic-condition feature $y_{k,n}$, are optimized at the same time as when the parameters $\Omega$ of the function for calculating the acoustic-condition feature are optimized.

This is because the calculation result of the acoustic-condition feature is used in the calculation process of the factorized hidden layer (see Equation (5) or Equation (9)). In other words, because the factorized hidden layer is coupled to the neural network serving as the acoustic-condition feature calculation model, the parameters of all of these neural networks can be optimized simultaneously, using the conventional neural network training procedure (error back propagation and SGD) (see Literature 6, "D. Yu and L. Deng, "Automatic Speech Recognition: A Deep Training Approach," Springer, 2015"). The derivative of each of the parameters of the linear transformation in the hidden layer is as expressed in Equations (11-1) and Equation (11-2).

$$\begin{cases} \dfrac{\partial F}{\partial W_{i,k}} = y_{k,n}\delta_{i,n}x_{i-1,n}^T & (11\text{-}1) \\ \dfrac{\partial F}{\partial b_{i,k}} = y_{k,n}\delta_{i,n} & (11\text{-}2) \end{cases}$$

"F" in Equation (11-1) and Equation (11-2) represents the optimization criteria (cross entropy, for example). The vector $\delta_{i,n}$ denotes a back-propagated error, and is calculates as Equation (12) below. A Hadamard multiplication is a multiplication of corresponding elements in matrices or vectors.

$$\delta_{i,n} = W_{i+1,n}^T \delta_{i+1,n} \otimes \Delta\sigma(z_{i,n}) \qquad (12)$$

Where $\otimes$ is a Hadamard multiplication, and $\Delta\sigma$ is a derivative of the activation function Equation (12) above is the same as the equation of error back-propagation according to the conventional technology, but the weighting matrix $W_{i+1,n}$ and the vector $z_{i,n}$ used in the Equation (12) are calculated based on the Equation (8-1) and Equation (8-2) that are newly introduced in the CADNN-JT, and Equation (5) mentioned above (or Equation (6) or Equation (7) mentioned above). The error vector $\delta_{I,n}$ is an error term. The error vector $\delta_{I,n}$ is calculated as a back-propagated error, as indicated in Equation (13) below, based on the vector $x_{i,n}$ and a correct HMM states $d_n$, in the same manner as in the conventional technology. The vector $x_{i,n}$ is a network output (the output probabilities of the HMM states) that is calculated based on an input feature vector Y and the NN. The correct HMM states $d_n$ is acquired from the input reference symbol sequence $S_r$.

$$\delta_{I,n} = d_n - x_{I,n} \qquad (13)$$

The derivatives of the parameters for the linear transformation in the hidden layer of the neural network serving as the acoustic-condition feature calculation model are as expressed as Equation (14-1) and Equation (14-2) below.

$$\begin{cases} \dfrac{\partial F}{\partial W'_{i'}} = \delta'_{i',n} x'^T_{i'-1,n} & (14\text{-}1) \\ \dfrac{\partial F}{\partial b'_{i'}} = \delta'_{i',n} & (14\text{-}2) \end{cases}$$

Where $\delta'_{i',n}$ denotes the error having been back-propagated to the neural network serving as the acoustic-condition feature calculation model, and is calculated as indicated in Equation (15) below.

$$\delta'_{i',n} = (W'_{i'+1,n}{}^T \delta'_{i'+1,n}) \otimes \Delta\sigma(z'_{i',n}) \qquad (15)$$

Where ⊗ is a Hadamard multiplication,
and Δσ is a derivative of the activation function The back-propagated error $\delta'_{i',n}$ in Equation (15) is calculated as indicated in Equation (16) below.

$$\delta'_{i',n} = \frac{\partial F}{\partial y_n} = \sum_p \frac{\partial F}{\partial x_{i,n,p}} \frac{\partial x_{i,n,p}}{\partial z_{i,n,p}} \frac{\partial z_{i,n,p}}{\partial y_n} = \sum_p \delta_{i,n,p} \begin{bmatrix} z_{1,i,n,p} \\ \vdots \\ z_{K,i,n,p} \end{bmatrix} \quad (16)$$

Where $\delta'_{i,p,n}$ is a $p^{th}$ dimensional error back-propagated to $i^{th}$ layer, and $z_{k,i,p,n}$ is the p-dimensional element in the $z_{k,i,n}$. $z_{k,i,n}$ is calculated as indicated in Equation (17) below.

$$z_{k,i,n} = W_{i,k} x_{i-1,n} + b_{i,k} \quad (17)$$

Example of Embodiment (Configuration of Acoustic Model Training Apparatus According to Embodiment)

Figure 10:
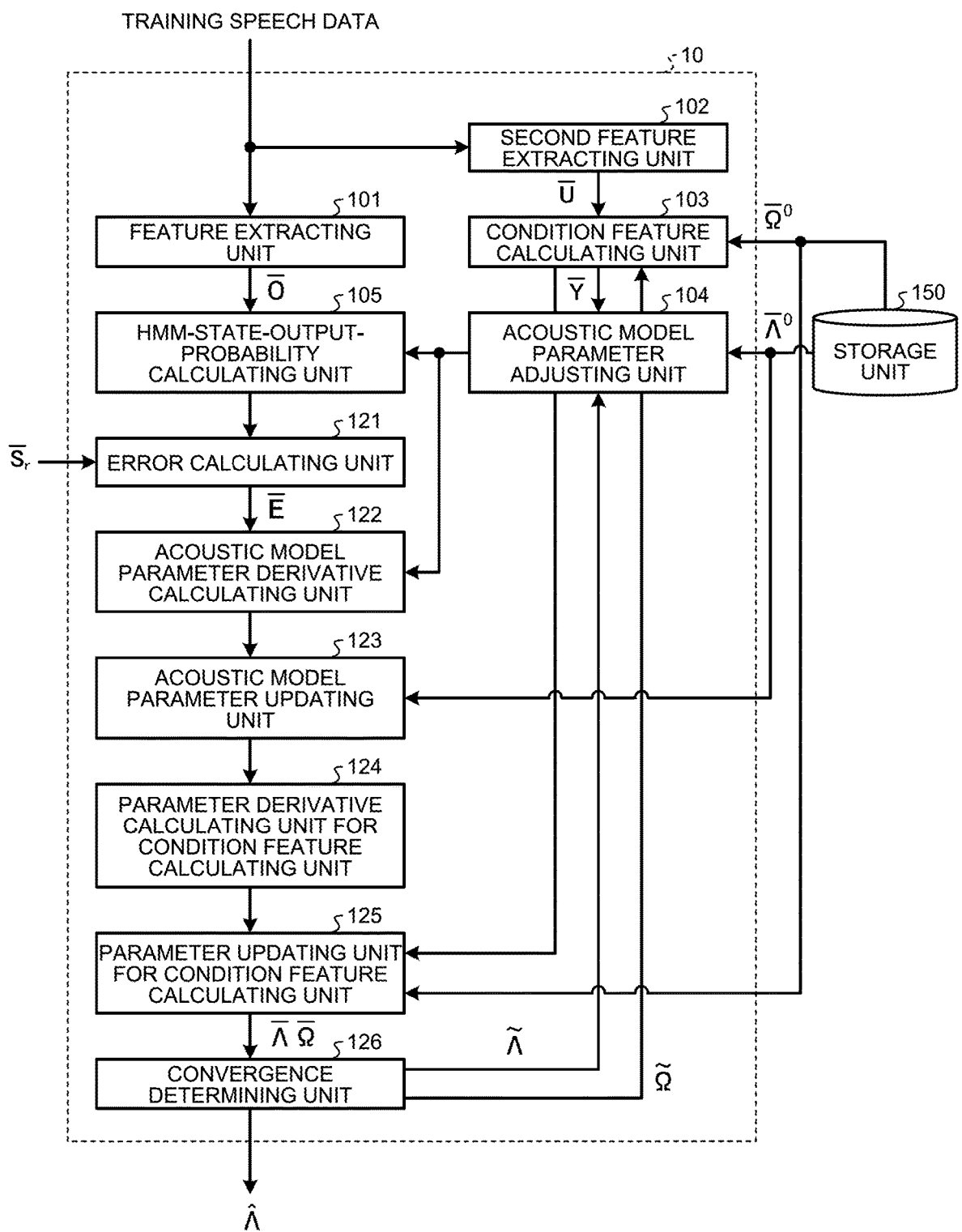
FIG. 10 is a schematic illustrating an example of a configuration of an acoustic model training apparatus according to the embodiment.

Based on the mathematical background according to the present embodiment described above, one example of the present embodiment will now be explained. FIG. 10 is a schematic illustrating an example of a configuration of an acoustic model training apparatus according to the present embodiment. As illustrated in FIG. 10, this acoustic model training apparatus 10 according to the present embodiment includes a feature extracting unit 101, a second feature extracting unit 102, a condition feature calculating unit 103, an acoustic model parameter adjusting unit 104, an HMM-state-output-probability calculating unit 105, an error calculating unit 121, an acoustic model parameter derivative calculating unit 122, an acoustic model parameter updating unit 123, a parameter derivative calculating unit 124 for the condition feature calculating unit, a parameter updating unit 125 for the condition feature calculating unit, and a convergence determining unit 126. The acoustic model training apparatus 10 is connected to a storage unit 150.

The storage unit 150 stores therein acoustic model parameters $\Lambda = \{W_{1,n}, b_{1,n} | n$ is a natural number within a range 1, 2, ..., N$\}$, as the parameters characterizing the acoustic model. N is the total number of frames included in one utterance for which the acoustic-condition feature vector $y_n$, which will be described later, is calculated for each frame.

The storage unit 150 also stores therein acoustic-condition calculation model parameters $\Omega = \{W'_{i'}, b'_{i'}, i', ..., I'\}$, as the parameters characterizing the acoustic-condition calculation model. N is the total number of frames included in one utterance for which the acoustic-condition feature vector $y_n$, which will be described later, is calculated for each frame. As mentioned in the explanation of Equation (9), $W'_{i'}$ is a transformation matrix, $b'_{i'}$ is a bias vector, and I' is a number resultant of adding one to the total number of hidden layers in the neural network used as the acoustic-condition feature calculation model, that is, the sum of the number of the hidden layers and the number of the output layer. The acoustic-condition calculation model is a model for generating an acoustic-condition feature vector –Y, which will be described later. Some examples of the acoustic-condition features include a feature of each speaker, the sex of speakers, and an acoustic environment related to noise or reverberation.

The feature extracting unit 101 reads training speech data observed with a microphone or the like, and generates a feature vector O from the training speech data. In other words, the feature extracting unit 101 extracts features from the training speech data. The specific process performed by the feature extracting unit 101 is the same as those performed by the feature extracting unit 201a according to the first conventional technology, the feature extracting unit 201b according to the second conventional technology, and the feature extracting unit 101c according to the third conventional technology.

The second feature extracting unit 102 reads the training speech data, and extracts a second feature vector sequence U as that expressed as Equation (18) below, and outputs the second feature vector sequence U to the condition feature calculating unit 103. The second feature extracting unit 102 may be configured to extract the feature vector O as the second feature vector by performing the same process that performed by the feature extracting unit 101, or to extract the features that are different from the feature vector O, e.g., i-vector.

$$U = \{u_1, u_2, \ldots, u_N | u_n \in R^L\} \quad (18)$$

In Equation (18), N is the total number of frames included in one utterance for which the second feature vector is calculated, and n is an integer taking a value within a range of 1 to N. In other words, the second feature vector sequence U includes the second features corresponding to the first to the $N^{th}$ frames. The second feature represents a characteristic of a speaker or an environment (such as noise or reverberation), for example. The second feature of each frame is represented as an L dimensional vector. The feature vector $u_n$ may also be fixed to a constant value across the several seconds or across one utterance, without taking a different value for each of the frames.

The condition feature calculating unit 103 reads the acoustic-condition calculation model parameters $\Omega$ characterizing the acoustic-condition calculation model, and the second features extracted by the second feature extracting unit 102, and calculates the acoustic-condition features representing acoustic conditions of the speech data, using Equation (9). The condition feature calculating unit 103 then outputs the calculated acoustic-condition features to the acoustic model parameter adjusting unit 104, as a feature vector Y as expressed in Equation (19) below.

$$Y = \{y_1, y_2, \ldots, y_N | y_n \in R^K\} \quad (19)$$

In Equation (19) above, N is the total number of frames included in one utterance for which the acoustic-condition feature vector $y_n$ is calculated for each frame, and n is a natural number within a range of 1 to N. In other words, the acoustic-condition feature vector Y includes the acoustic-condition feature vectors $y_n$ corresponding to the first to the $N^{th}$ frames. The acoustic-condition feature vector $y_n$ corresponding to each of the frames is represented as a K dimensional vector. The acoustic-condition feature vector $y_n$ corresponding to each of the frames may be fixed to a constant value across the several seconds or across one utterance, without taking a different value for each of the frames.

The acoustic model parameter adjusting unit 104 adjusts the acoustic model parameters $\Lambda$ characterizing the acoustic model read from the storage unit 150, based on the acoustic-condition feature vector Y generated by the condition feature calculating unit 103, using Equation (8-1) and Equation (8-2) above. The initial values of the acoustic model parameters $\Lambda$ to be adjusted by the acoustic model parameter adjusting unit 104 are, for example, parameters determined using random numbers, or acoustic model parameters having trained using the first to the third conventional technologies. The acoustic model parameter adjusting unit 104 outputs the adjusted parameters $\hat{\Lambda}$ resultant of adjusting to the HMM-state-output-probability calculating unit 105.

The HMM-state-output-probability calculating unit 105 calculates the output probabilities of the HMM states, based on the acoustic model parameters $\hat{\Lambda}$ adjusted by the acoustic model parameter adjusting unit 104 and the feature vector O generated by the feature extracting unit 101. The specific process performed by the HMM-state-output-probability calculating unit 105 is the same as those performed by the HMM-state-output-probability calculating unit 205a according to the first conventional technology, and by the HMM-state-output-probability calculating unit 205b according to the second conventional technology.

The error calculating unit 121 calculates an error vector $\delta_{I,n}$ based on the output probabilities of the HMM states, the output probabilities being calculated by the HMM-state-output-probability calculating unit 105, and an input reference symbol sequence $-S_r$ (correct HMM states) using Equation (13) mentioned above. The error calculating unit 121 also calculates an error vector $\delta'_{I',n}$ indicating the error back-propagated to the neural network serving as the acoustic-condition feature calculation model, using Equation (16) mentioned above.

The acoustic model parameter derivative calculating unit 122 calculates the derivatives of the acoustic model parameters based on the error vector $\delta_{I,n}$ calculated by the error calculating unit 121 and the acoustic model parameters $\hat{\Lambda}$ adjusted by the acoustic model parameter adjusting unit 104. The acoustic model parameter derivative calculating unit 122 calculates the derivatives of the acoustic model parameters using Equation (11-1), Equation (11-2), and Equation (12) indicating the back-propagated error. Alternatively, the acoustic model parameter derivative calculating unit 122 may also calculate the derivatives using conventional stochastic gradient descent (SGD) (see Literature 6 mentioned above). It is also possible to use momentum or L2 regularization, which are often used in speeding-up the parameter training.

The acoustic model parameter updating unit 123 updates the acoustic model parameters $\Lambda$ based on the acoustic model parameters $\Lambda$ read from the storage unit 150, and the derivatives of the acoustic model parameters calculated by the acoustic model parameter derivative calculating unit 122, using Equation (20-1) and Equation (20-2) below. In this manner, the acoustic model parameter updating unit 123 updates the acoustic model parameters based on the adjusted acoustic model parameters and the values calculated from the features.

$$\begin{cases} \tilde{W}_{i,k} = \overline{W}_{i,k} + \eta \dfrac{\partial F}{\partial W_{i,k}} & (20\text{-}1) \\ \tilde{b}_{i,k} = \overline{b}_{i,k} + \eta \dfrac{\partial F}{\partial b_{i,k}} & (20\text{-}2) \end{cases}$$

In Equation (20-1) and Equation (20-2) mentioned above, the weighting matrix $\sim W_{i,k}$ and the bias vector $\sim b_{i,k}$ are those included in the updated acoustic model parameters $\sim \Lambda$, and the weighting matrix $-W_{i,k}$ and the bias vector $-b_{i,k}$ are those included in the acoustic model parameters $-\Lambda$ having been acquired at the previous stage. Furthermore, in Equation (20-1) and Equation (20-2) mentioned above, $\eta$ is the learning rate, which is a variable in SGD, and takes a small value within a range of 0.1 to 0.0001, for example. $\eta$ represents a parameter for adjusting the acoustic model parameters.

The parameter derivative calculating unit 124 for the condition feature calculating unit calculates the parameters of the acoustic-condition calculation model, that is, the derivatives of the parameters of the condition feature calculating unit, based on the error vector $\delta_{i,n}$ calculated by the error calculating unit 121, and the parameters $\Omega$ of the acoustic-condition calculation model. The parameter derivative calculating unit 124 for the condition feature calculating unit calculates the derivatives of the parameters in the condition feature calculating unit using above-mentioned Equation (14-1), Equation (14-2), and Equation (15) indicating the back-propagated error. The parameter derivative calculating unit 124 for the condition feature calculating unit may also use the same approach as that used by the acoustic model parameter derivative calculating unit 122.

The parameter updating unit 125 for the condition feature calculating unit updates the acoustic-condition calculation model parameters Q, based on the acoustic-condition calculation model parameters $\Omega$ read from the storage unit 150, and the derivatives of the parameters calculated by the parameter derivative calculating unit 124 for the condition feature calculating unit, using Equation (21-1) and Equation (21-2). In this manner, the parameter updating unit 125 for the condition feature calculating unit updates the parameters of the acoustic-condition calculation model based on the adjusted parameters and the values calculated based on the features.

$$\begin{cases} \tilde{W}'_{i'} = \overline{W}'_{i'} + \eta' \dfrac{\partial F}{\partial W'_{i'}} & (21\text{-}1) \\ \tilde{b}'_{i'} = \overline{b}'_{i'} + \eta' \dfrac{\partial F}{\partial b'_{i'}} & (21\text{-}2) \end{cases}$$

In Equation (21-1) and Equation (21-2) mentioned above, the weighting matrix $\sim W'_{i,k}$ and the bias vector $\sim b'_{i,k}$ are included in the updated parameters $\sim \Omega$ of the acoustic-condition calculation model, and the weighting matrix $-W'_{i,k}$ and the bias vector $-b'_{i,k}$ are the parameters $-\Omega$ of the acoustic-condition calculation model before the update. In Equation (21-1) and Equation (21-2) mentioned above, $\eta'$ is the learning rate that is a variable of SGD, and takes a small value within a range of 0.1 to 0.0001, for example. $\eta'$ is a parameter for adjusting the acoustic-condition calculation model parameters.

The convergence determining unit 126 determines, for acoustic model parameters $\sim \Lambda$ and the parameter $\sim \Omega$ of the acoustic-condition calculation model, having been updated by the acoustic model parameter updating unit 123, whether the training (estimation) of the acoustic model parameters $\Lambda$ and the acoustic-condition calculation model parameters $\Omega$ has satisfied a predetermined converging condition. If the convergence determining unit 126 determines that the predetermined converging condition has been satisfied, the convergence determining unit 126 outputs the acoustic model parameters $\sim \Lambda$ with which the determination as to whether the converging condition is satisfied is made, as the output of the acoustic model training apparatus 10. The acoustic model parameters $\sim \Lambda$ output from the acoustic model training apparatus 10 are stored in the storage unit 150, for example.

If the convergence determining unit 126 determines that the predetermined converging condition has not been satisfied yet, the convergence determining unit 126 outputs the acoustic model parameters $\sim \Lambda$ with which the determination as to whether the converging condition is satisfied is made to the acoustic model parameter adjusting unit 104, and outputs the acoustic-condition calculation model parameters ~Ω with which the determination as to whether the converging condition is satisfied is made to the condition feature calculating unit 103. The condition feature calculating unit 103, the acoustic model parameter adjusting unit 104, the HMM-state-output-probability calculating unit 105, the error calculating unit 121, the acoustic model parameter derivative calculating unit 122, the acoustic model parameter updating unit 123, and the convergence determining unit 126 then repeat their processes. At this time, the acoustic model parameters ~Λ and the acoustic-condition calculation model parameter ~Ω with which the determination that the predetermined converging condition is satisfied is made may also be stored in the storage unit 150, and used as the initial values of the parameters in the upcoming process.

The convergence determining unit 126 determines whether the converging condition has been satisfied using predetermined one of the following conditions, for example: (1) if the difference between the acoustic model parameters −Λ or the acoustic-condition calculation model parameter −Ω having been acquired at a previous step and the acoustic model parameters ~Λ or the acoustic-condition calculation model parameter ~Ω having been updated is equal to or smaller than a threshold; (2) if the determination as to whether the converging condition has been satisfied has been repeated by a number of times exceeding a predetermined number of times; and (3) if a predetermined performance index indicating a performance evaluated with a part of the training speech data has dropped to a level equal to or lower than a predetermined level.

(Acoustic Model Training Process According to Embodiment)

Figure 11:
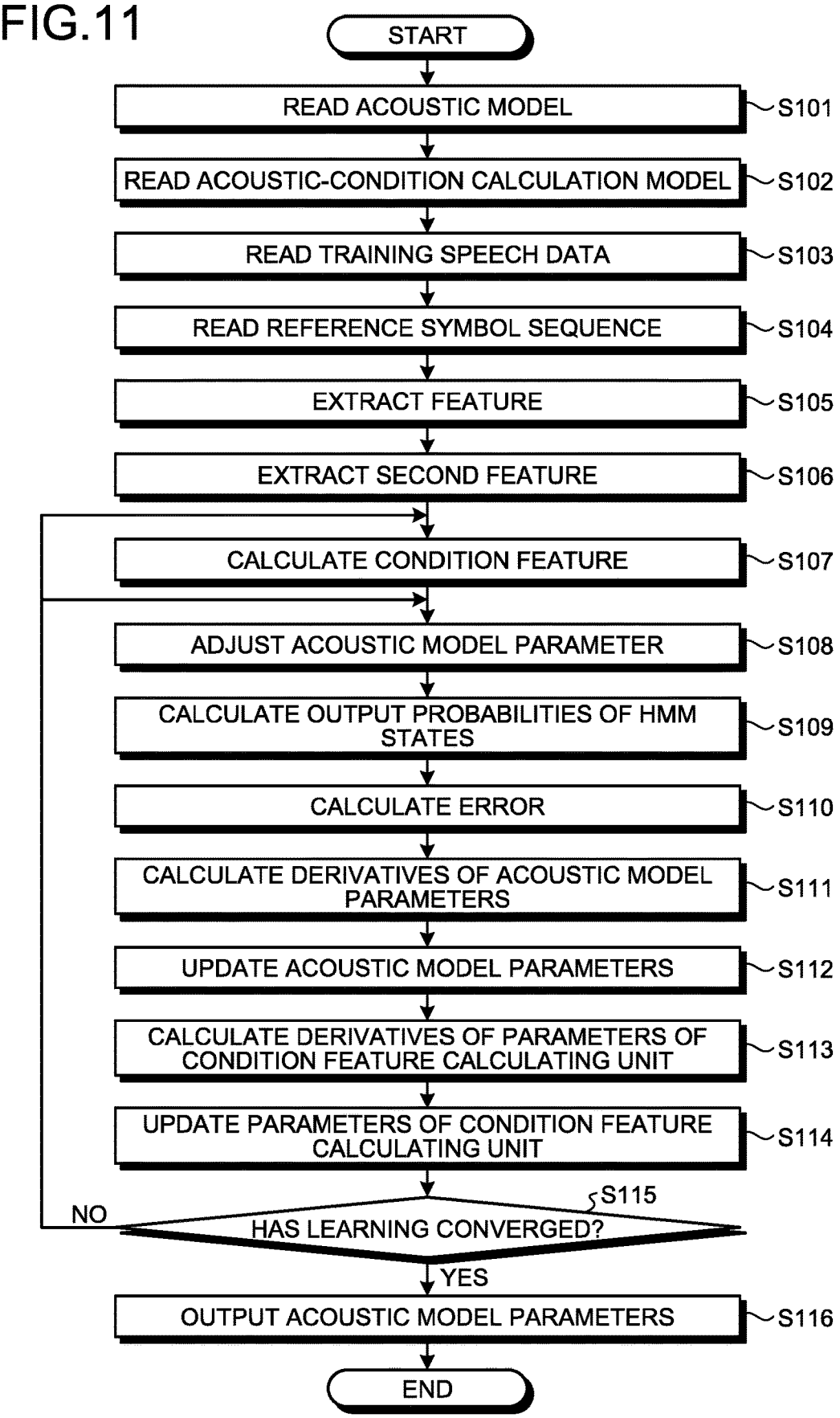
FIG. 11 is a flowchart illustrating an example of an acoustic model training process according to the embodiment.

FIG. 11 is a flowchart illustrating an example of an acoustic model training process according to the present embodiment. To begin with, the acoustic model training apparatus 10 reads the acoustic model (the acoustic model parameters Λ) from the storage unit 150 (Step S101). The acoustic model training apparatus 10 then reads the acoustic-condition calculation model (the acoustic-condition calculation model parameters Ω) from the storage unit 150 (Step S102). The acoustic model training apparatus 10 then reads the training speech data (Step S103). The acoustic model training apparatus 10 then reads the reference symbol sequence −$S_r$ (Step S104).

The acoustic model training apparatus 10 then extracts the feature vector O from the training speech data (Step S105). The acoustic model training apparatus 10 then extracts the second feature vector sequence U from the training speech data (Step S106). The acoustic model training apparatus 10 then calculates the acoustic-condition feature vector Y from the acoustic-condition calculation model parameters Ω and the second feature vector sequence, using Equation (9) mentioned above (Step S107). The acoustic model training apparatus 10 then adjusts acoustic model parameters Λ read from the storage unit 150 based on the acoustic-condition feature vector Y, using Equation (8-1) and Equation (8-2) mentioned above (Step S108). The acoustic model training apparatus 10 then calculates the output probabilities of the HMM states, based on the adjusted acoustic model parameters Λ and the feature vector O (Step S109).

The acoustic model training apparatus 10 then calculates the error vector $\delta_{I,n}$ based on the output probabilities of the HMM states and the input reference symbol sequence −$S_r$, using Equation (13) mentioned above, and calculates the error vector $\delta'_{I,n}$ using Equation (16) mentioned above (Step S110).

The acoustic model training apparatus 10 then calculates the derivatives of the acoustic model parameters based on the error vector $\delta_{I,n}$ and the adjusted acoustic model parameters Λ (Step S111). The acoustic model training apparatus 10 then updates the acoustic model parameters Λ, based on the acoustic model parameters Λ read from the storage unit 150 and the derivatives of the acoustic model parameters, using Equation (20-1) and Equation (20-2) mentioned above (Step S112).

The acoustic model training apparatus 10 then calculates the derivatives of the parameters of the acoustic-condition calculation model based on the error vector $\delta'_{I,n}$ and the acoustic-condition calculation model parameters Ω (Step S113). The acoustic model training apparatus 10 then updates the acoustic-condition calculation model parameters Ω based on the acoustic-condition calculation model parameters Ω read from the storage unit 150, and the derivatives of the parameters of the acoustic-condition calculation model, using Equation (21-1) and Equation (21-2) mentioned above (Step S114).

The acoustic model training apparatus 10 then determines, for the updated acoustic model parameters ~Λ and the acoustic-condition calculation model parameters ~Ω, whether the training of the acoustic model parameters Λ and the acoustic-condition calculation model parameters Ω has satisfied a predetermined converging condition (Step S115). If the training of the acoustic model parameters Λ and the acoustic-condition calculation model parameters Ω has satisfied the predetermined converging condition (Yes at Step S115), the acoustic model training apparatus 10 shifts the process to Step S116. If the training of acoustic model parameters Λ or the acoustic-condition calculation model parameters Ω has not satisfied a predetermined converging condition (No at Step S115), the acoustic model training apparatus 10 shifts the process to Step S107 or Step S108. At Step S116, the acoustic model training apparatus 10 outputs the acoustic model parameters ~Λ with which the determination as to whether the predetermined converging condition has been satisfied is made, as the output of the acoustic model training apparatus 10 (Step S116). The acoustic model parameters ~Λ and the acoustic-condition calculation model parameter ~Ω with which the determination as to whether the predetermined converging condition has been satisfied is made may also be stored in the storage unit 150, and used as initial values of the parameters in the next process.

(Configuration of Speech Recognition Apparatus According to Embodiment)

Figure 12:
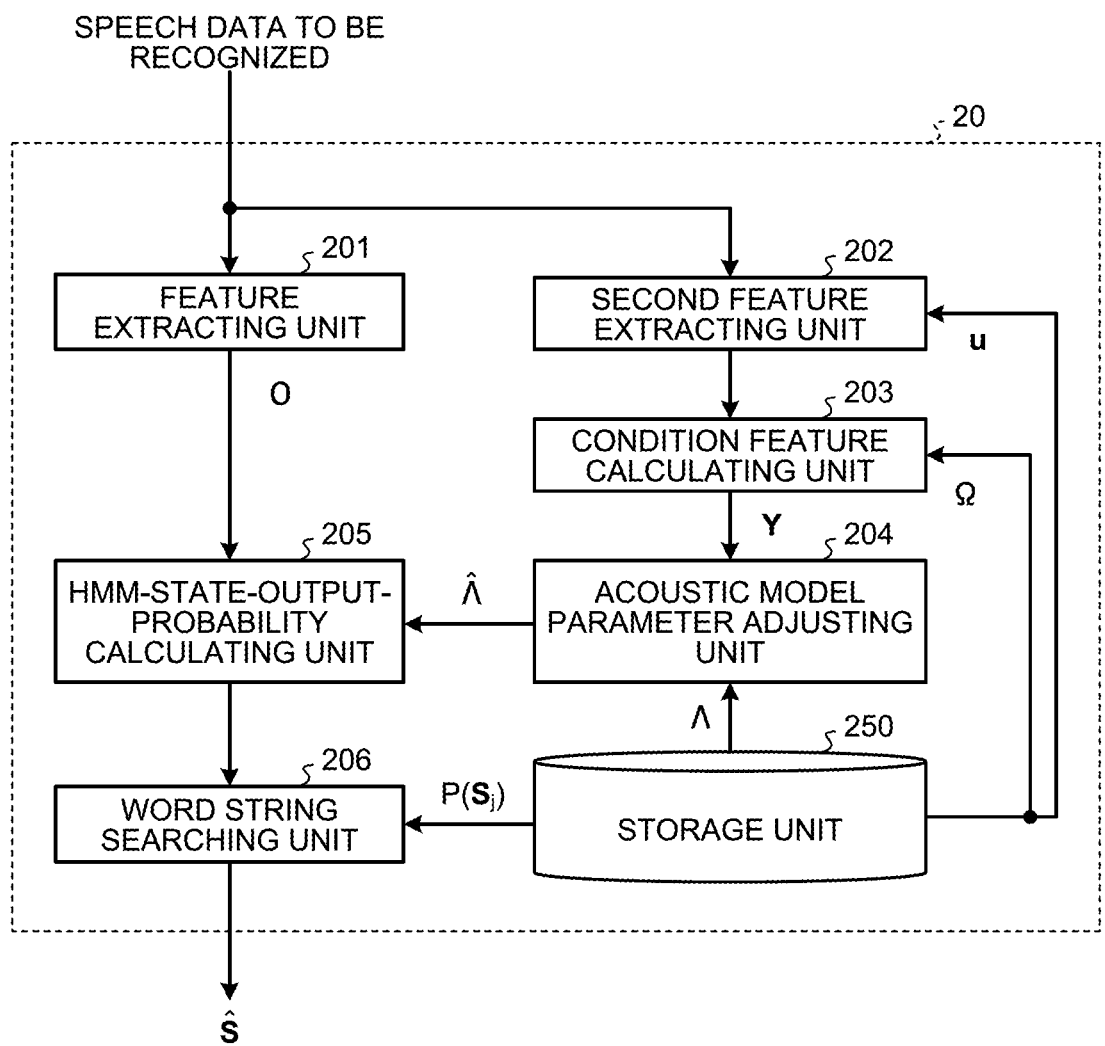
FIG. 12 is a schematic illustrating an example of a configuration of a speech recognition apparatus according to the embodiment.

FIG. 12 is a schematic illustrating an example of a configuration of a speech recognition apparatus according to the present embodiment. As illustrated in FIG. 12, this speech recognition apparatus 20 according to the present embodiment includes a feature extracting unit 201, a second feature extracting unit 202, a condition feature calculating unit 203, an acoustic model parameter adjusting unit 204, an HMM-state-output-probability calculating unit 205, and a word string searching unit 206. The speech recognition apparatus 20 is connected to a storage unit 250.

The acoustic model (acoustic model parameters Λ) and the acoustic-condition calculation model (the acoustic-condition calculation model parameters Ω) updated by the acoustic model training apparatus 10, the language model, the parameter η for adjusting the acoustic model parameters, and the parameter η' for adjusting the acoustic-condition calculation model parameters are stored in the storage unit 250 in advance.

The feature extracting unit 201 reads a sequence of speech data to be recognized having been observed with a microphone or the like, extracts features from the speech data to be recognized, and generates a feature vector O. In other words, the feature extracting unit 201 extracts features from a sequence of speech data to be recognized. The specific process performed by the feature extracting unit 201 is the same as that performed by the feature extracting unit 101 included in the acoustic model training apparatus 10.

The second feature extracting unit 202 reads a sequence of speech data to be recognized having been observed with a microphone or the like, extracts features from the speech data to be recognized, and generates a second feature vector sequence U. In other words, the feature extracting unit 201 extracts features from a sequence of speech data to be recognized. The specific process performed by the feature extracting unit 201 is the same as that performed by the second feature extracting unit 102 included in the acoustic model training apparatus 10.

The condition feature calculating unit 203 reads the acoustic-condition calculation model parameters 2 and the second features extracted by the second feature extracting unit 202, and calculates the acoustic-condition features using Equation (9). The condition feature calculating unit 203 then outputs the calculated acoustic-condition features to the acoustic model parameter adjusting unit 204, as the feature vector Y, an example of which is indicated as Equation (19). The specific process performed by the condition feature calculating unit 203 is the same as that performed by the condition feature calculating unit 103 included in the acoustic model training apparatus 10.

The acoustic model parameter adjusting unit 204 corrects the acoustic model parameters Λ based on the acoustic model parameters Λ read from the storage unit 250, and the acoustic-condition feature vector Y generated by the condition feature calculating unit 203, using Equation (8-1) and Equation (8-2) mentioned above. The specific process performed by the acoustic model parameter adjusting unit 204 is the same as that performed by the acoustic model parameter adjusting unit 104 included in the acoustic model training apparatus 10.

The HMM-state-output-probability calculating unit 205 calculates the output probabilities of the HMM states, based on the acoustic model parameters ^Λ adjusted by the acoustic model parameter adjusting unit 204, and the feature vector O generated by the feature extracting unit 201. The specific process performed by the HMM-state-output-probability calculating unit 205 is the same as that performed by the HMM-state-output-probability calculating unit 105 included in the acoustic model training apparatus 10.

The word string searching unit 206 outputs a word string using the output probabilities of the HMM states calculated based on the features and the adjusted parameters, and the generation probabilities in the language model. In other words, the word string searching unit 206 searches the language model read from the storage unit 250, based on the output probabilities of the HMM states, calculated by the HMM-state-output-probability calculating unit 205, and output a word string ^S as a speech recognition result. The specific process performed by the word string searching unit 206 is the same as that performed by the word string searching unit 206a included in the speech recognition apparatus 20a according to the first conventional technology, and the word string searching unit 206b included in the speech recognition apparatus 20b according to the second conventional technology.

(Speech Recognition Process According to Embodiment)

Figure 13:
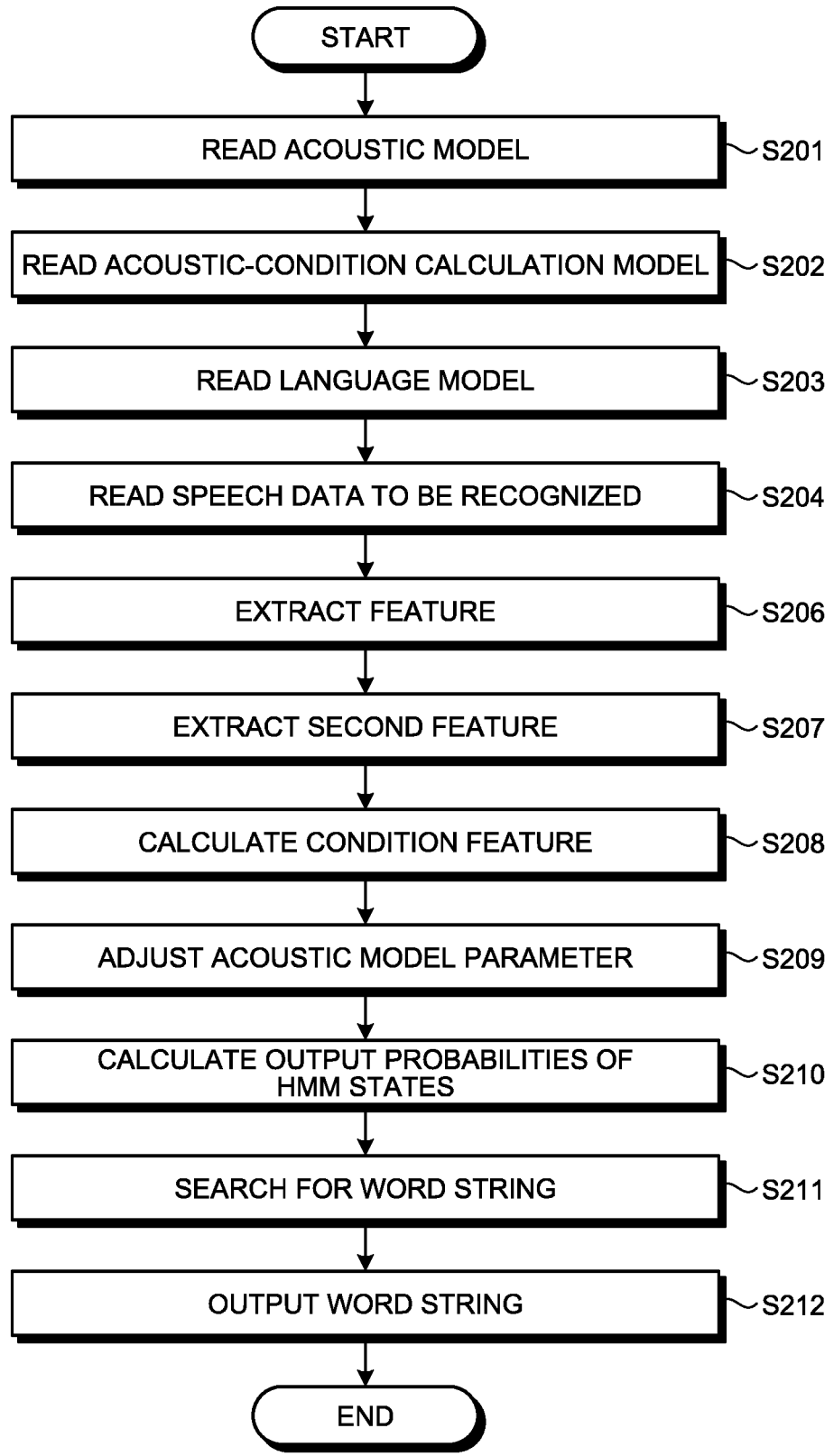
FIG. 13 is a flowchart illustrating an example of a speech recognition process according to the embodiment.

FIG. 13 is a flowchart illustrating an example of a speech recognition process according to the present embodiment. To begin with, the speech recognition apparatus 20 reads the acoustic model (acoustic model parameters Λ) from the storage unit 250 (Step S201). The speech recognition apparatus 20 then reads the acoustic-condition calculation model from the storage unit 250 (Step S202). The speech recognition apparatus 20 then reads the language model from the storage unit 250 (Step S203). The speech recognition apparatus 20 then reads a sequence of speech data to be recognized (Step S204).

The speech recognition apparatus 20 then extracts the feature vector O from the training speech data (Step S206). The speech recognition apparatus 20 then extracts the second feature vector sequence U from the training speech data (Step S207). The speech recognition apparatus 20 then calculates the acoustic-condition feature vector Y from the acoustic-condition calculation model parameters Ω and the second feature vector sequence, using Equation (9) mentioned above (Step S208). The speech recognition apparatus 20 then adjusts the acoustic model parameters Λ read from the storage unit 250 based on the acoustic-condition feature vector Y, using Equation (8-1) and Equation (8-2) mentioned above (Step S209).

The speech recognition apparatus 20 then calculates the output probabilities of the HMM states, based on the adjusted acoustic model parameters Λ and the feature vector O (Step S210). The speech recognition apparatus 20 then searches the language model read from the storage unit 250, based on the output probabilities of the HMM states (Step S211). The speech recognition apparatus 20 then outputs a word string ^S as the speech recognition result, from the result of search performed at Step S211 (Step S212).

Other Embodiments

Explained in the embodiment is an example in which the acoustic model that is based on the DNN (CADNN) is coupled to the acoustic-condition calculation model. However, the acoustic model is not limited to the DNN, and any acoustic model that is based on various types of neural network, such as a convolutional neural network (CNN), a recurrent neural network (RNN), or a bidirectional long short-term memory (BLSTM), may be coupled to the acoustic-condition calculation model, and formularized in the same manner. Furthermore, the acoustic model according to the present invention is not limited to the HMM-based acoustic model, and any acoustic model for calculating the output probabilities using any neural network may be used. For example, the acoustic model according to the present invention may be a model that is based on connectionist temporal classification (CTC) or an encoder-decoder.

Advantageous Effects Achieved by Embodiment

In the acoustic model training apparatus 10 according to the present embodiment, the feature extracting unit 101 and the second feature extracting unit 102 extract speech features representing speech characteristics. Furthermore, the condition feature calculating unit 103 calculates an acoustic-condition feature representing a feature of an acoustic condition of the speech data using an acoustic-condition calculation model that is represented as a neural network, based on the features and an acoustic-condition calculation model parameter characterizing the acoustic-condition calculation model. Furthermore, the acoustic model parameter adjusting unit 104 generates an adjusted acoustic model parameter that is an acoustic model parameter adjusted based on the acoustic-condition feature, the acoustic model parameter characterizing an acoustic model represented as a neural network to which the output layer of the acoustic-condition calculation model is coupled. Furthermore, the acoustic model parameter updating unit 123 updates the acoustic model parameter based on the adjusted parameter and the feature. Furthermore, the parameter updating unit 125 for the condition feature calculating unit updates the acoustic-condition calculation model parameter based on the adjusted parameter and the feature.

In this manner, according to the present embodiment, it is possible to calculate an acoustic-condition feature from a small amount of speech data (only a few seconds or so), without using any label (speaker ID or transcription), advantageously. As a result, fast acoustic model adaptations are made possible.

In other words, according to the present embodiment, an acoustic model can be adapted to acoustic conditions using a small amount of speech data, and a higher speech recognition performance can be achieved, being higher compared with that achieved with the conventional technologies, without switching the acoustic model depending on the acoustic conditions, as required in the conventional technology.

Furthermore, according to the present embodiment, the neural network representing the acoustic-condition calculation model can be optimized based on an error that is back-propagated over the neural network representing the acoustic model. Therefore, the parameter of the acoustic-condition feature calculation model and the parameter of the acoustic model can be optimized simultaneously. In this manner, the entire neural networks including the acoustic-condition feature calculation model can be optimized at the same time, based on the optimization criteria for optimizing the speech recognition, and therefore, the accuracy of the speech recognition is improved.

Furthermore, the feature extracting unit 101 may extract first features, and the second feature extracting unit 102 may extract second features that are different from the first features, as the feature. In such a configuration, the condition feature calculating unit 103 calculates the acoustic-condition feature based on the acoustic-condition calculation model parameter and the second features. Furthermore, the acoustic model parameter updating unit 123 updates the acoustic model parameter based on the adjusted parameter and the first features. Furthermore, the parameter updating unit 125 for the condition feature calculating unit updates the acoustic-condition calculation model parameter based on the adjusted parameter and the second features. In this manner, the acoustic model and the acoustic-condition calculation model can be optimized simultaneously while using different features for these models. Therefore, training can be carried out using features that allow these models to be optimized highly accurately.

Furthermore, in the speech recognition apparatus 20 according to the present embodiment, the feature extracting unit 201 and the second feature extracting unit 202 for the speech recognition extract features representing the features of speech data. Furthermore, the condition feature calculating unit 203 for the speech recognition calculates an acoustic-condition feature representing a feature of an acoustic condition of the speech data using the acoustic-condition calculation model, based on the acoustic-condition calculation model parameters and the feature. Furthermore, the acoustic model parameter adjusting unit 204 for the speech recognition generates an adjusted parameter that is an acoustic model parameter adjusted based on the acoustic-condition feature. Furthermore, the word string searching unit 206 outputs a word string, using HMM state output probabilities calculated based on the features and the adjusted parameter, and a generation probability of the language model. Because speech recognitions can be performed using the acoustic-condition calculation model parameter meeting the optimization criteria for optimizing the speech recognition, the speech recognition accuracy is improved.

In the speech recognition task AURORA4, the acoustic model was subjected to unsupervised adaptations to speakers in units of one utterance, using each of the techniques described above, and the results (word error ratios) were as indicated in Table 1. The adaptations of the acoustic model can be said to be performed at a high speed, using a small amount of data, because the acoustic-condition features were being calculated in units of one utterance (only a few seconds or so). Used were three techniques, the baseline (the speech recognition based on the conventional neural network), the CADNN, and the CADNN-JT that is the technique used in the present embodiment according to the present invention. Based on Table 1, it can be seen that the present invention has achieved higher performance than that achieved by the conventional speech recognition (baseline) or the conventional CADNN.

TABLE 1

| | Word error ratio (%) |
|---|---|
| Baseline (Speech recognition based on conventional neural network) | 11.9 |
| Conventional CADNN | 12.4 |
| Present invention (CADNN-JT) | 10.7 |

(Configurations of Acoustic Model Training Apparatus and Speech Recognition Apparatus)

The elements included in the acoustic model training apparatus 10 illustrated in FIG. 10 and the speech recognition apparatus 20 illustrated in FIG. 12 are merely functional and conceptual representations, and are not necessarily need to be configured physically in a manner illustrated in the drawings. In other words, the specific configurations in which the functions of the acoustic model training apparatus 10 and the speech recognition apparatus 20 are distributed or integrated are not limited to those illustrated, and the whole or a part of the functions may be functionally or physically distributed or integrated into any units, depending on various loads or utilizations. For example, the feature extracting unit 101 and the second feature extracting unit 102 may be integrated into one functional unit, and may be configured to output different features to the HMM-state-output-probability calculating unit 105 and to the condition feature calculating unit 103. The same is applicable to the feature extracting unit 201 and the second feature extracting unit 202.

Furthermore, for example, the acoustic model training apparatus 10 and the speech recognition apparatus 20 may be integrated into one apparatus. In an configuration in which the acoustic model training apparatus 10 and the speech recognition apparatus 20 are integrated into one apparatus, the feature extracting unit 101 and the feature extracting unit 201, the second feature extracting unit 102 and the second feature extracting unit 202, the condition feature calculating unit 103 and the condition feature calculating unit 203, the acoustic model parameter adjusting unit 104 and the acoustic model parameter adjusting unit 204, and the HMM-state-output-probability calculating unit 105 and the HMM-state-output-probability calculating unit 205, having the same functions in the acoustic model training apparatus 10 and the speech recognition apparatus 20, respectively, may be the same functional units.

Furthermore, the processes performed in the acoustic model training apparatus 10 and the speech recognition apparatus 20 are not limited to those illustrated in the drawings, and the order of the processes may be changed, or the processes may be integrated or divided. For example, the order in which the processes at Steps S101 to S104 and Steps S201 to S205 are performed in the present embodiment may be swapped.

Furthermore, the processes executed in the acoustic model training apparatus 10 and the speech recognition apparatus 20 may be implemented, partly or entirely, as a processor such as a central processing unit (CPU) and a computer program that is parsed and executed by the processor. The processes executed in the acoustic model training apparatus 10 and the speech recognition apparatus 20 may also be implemented as hardware using wired logic.

Furthermore, a part or the whole of the processes explained in the present embodiment to be executed automatically may be executed manually. Furthermore, a part or the whole of the processes explained in the present embodiment to be executed manually may be executed automatically using a known method. In addition, the sequence of the processes and control, specific names, information including various types of data and parameters described above or illustrated in the drawings may be changed as appropriate, unless specified otherwise.

(Computer Program)

As one embodiment, the acoustic model training apparatus and the speech recognition apparatus may be implemented by installing an acoustic model training program for executing the training of the acoustic model or a speech recognition program for executing the speech recognition to a desirable computer, as a package software or an on-line software. For example, by causing an information processing apparatus to execute the acoustic model training program or the speech recognition program, it is possible to enable the information processing apparatus to function as the acoustic model training apparatus or the speech recognition apparatus. The information processing apparatus herein includes a desktop or a laptop personal computer. Furthermore, mobile communication terminals such as a smartphone, a mobile telephone terminal, and a personal handy-phone system (PHS), and slate terminals such as a personal digital assistant (PDA) also fall within the scope of the information processing apparatus.

Furthermore, the acoustic model training apparatus and the speech recognition apparatus may be implemented as a server device that provides a service related to the training of the acoustic model or the speech recognition to a client that is a terminal device used by a user. For example, the acoustic model training apparatus is implemented as a server device that provides a service for training an acoustic model by receiving an input of training speech data and outputting an acoustic-condition calculation model. Furthermore, for example, the speech recognition apparatus is implemented as a server device providing a speech recognition service receiving an input of speech data to be recognized, and outputting a word string as a recognition result. In these cases, the acoustic model training apparatus and the speech recognition apparatus may be implemented as a Web server or a cloud providing the service related to the training of the acoustic model or the speech recognition described above, as outsourcing.

Figure 14:
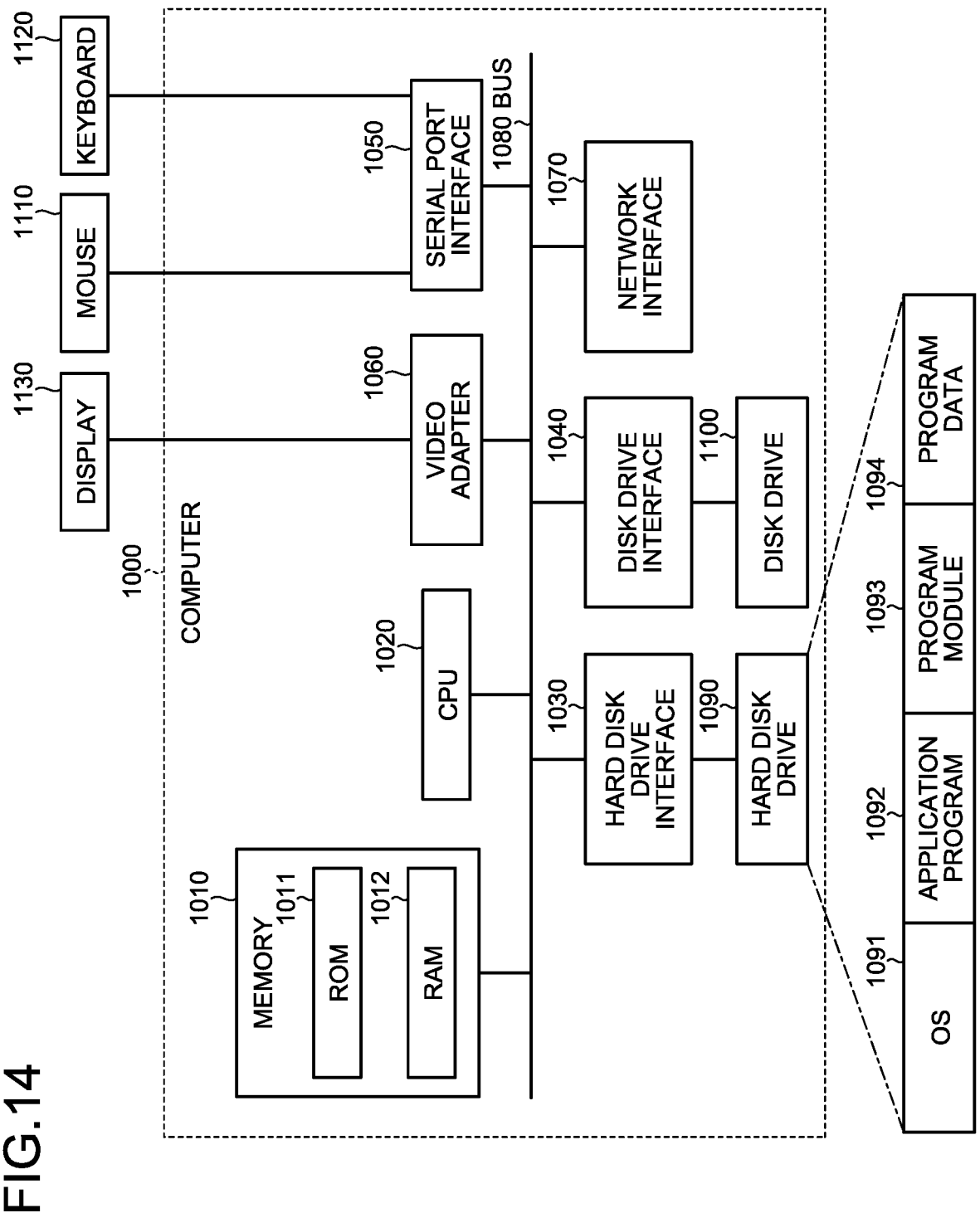
FIG. 14 is a schematic illustrating an example of a computer implementing the acoustic model training apparatus and the speech recognition apparatus according to the embodiment by executing a computer program.

FIG. 14 is a schematic illustrating an example of a computer implementing the acoustic model training apparatus or the speech recognition apparatus by executing a computer program. This computer 1000 includes, for example, a memory 1010 and a CPU 1020. The computer 1000 also includes a hard disk drive interface 1030, a disk drive interface 1040, a serial port interface 1050, a video adapter 1060, and a network interface 1070. These units are connected to one another over a bus 1080.

The memory 1010 includes a read-only memory (ROM) 1011 and a random access memory (RAM) 1012. The ROM 1011 stores therein booting computer programs such as a basic input output system (BIOS). The hard disk drive interface 1030 is connected to a hard disk drive 1090. The disk drive interface 1040 is connected to a disk drive 1100. A removable storage medium, such as a magnetic disk or an optical disk, is inserted to the disk drive 1100. A mouse 1110 or a keyboard 1120, for example, is connected to the serial port interface 1050. A display 1130, for example, is connected to the video adapter 1060.

The hard disk drive 1090 stores therein an operating system (OS) 1091, an application program 1092, a program module 1093, and program data 1094, for example. In other words, the computer program specifying the processes of the acoustic model training apparatus or the speech recognition apparatus is implemented as the program module 1093, in which a computer-executable code is specified. The program module 1093 is stored in the hard disk drive 1090, for example. The program module 1093 for executing the processes that are the same as the functional units of the acoustic model training apparatus or the speech recognition apparatus is stored in the hard disk drive 1090, for example. The hard disk drive 1090 may be replaced by a solid state drive (SSD).

Furthermore, the setting data used in the processes in the embodiment described above is stored in the memory 1010 or the hard disk drive 1090, as program data 1094, for example. The CPU 1020 then reads the program module 1093 or the program data 1094 stored in the memory 1010 or the hard disk drive 1090 onto the RAM 1012, and executes the program module 1093 as required.

The program module 1093 or the program data 1094 may be stored in a removable storage medium, for example, without limitation to being stored in the hard disk drive 1090, and may be read by the CPU 1020 via the disk drive 1100 or the like. Alternatively, the program module 1093 and the program data 1094 may be stored in another computer that is connected over a network (such as a local area network (LAN) or a wide area network (WAN)). The CPU 1020 may then read the program module 1093 and the program data 1094 from the other computer via the network interface 1070.

REFERENCE SIGNS LIST 10 acoustic model training apparatus
20 speech recognition apparatus
101, 201 feature extracting unit
102, 202 second feature extracting unit
103, 203 condition feature calculating unit
104, 204 acoustic model parameter adjusting unit
105, 205 HMM-state-output-probability calculating unit
121 error calculating unit
122 acoustic model parameter derivative calculating unit
123 acoustic model parameter updating unit
124 parameter derivative calculating unit for the condition feature calculating unit 125 parameter updating unit for the condition feature calculating unit
126 convergence determining unit
206 word string searching unit
150, 250 storage unit

The invention claimed is:

1. A speech recognition apparatus comprising:
a memory; and
a processor coupled to the memory and programmed to execute a process comprising:
transforming speech data to be recognized into information identifying a symbol sequence by a neural network; and
adjusting at least a part of parameters of the neural network based on input acoustic-condition features, wherein
the transforming transforms the speech data into the information identifying the symbol sequence by the neural network in which the at least a part of parameters is adjusted by the adjusting,
wherein the neural network includes a same number of divided hidden layers as the number of the acoustic-condition features, and a layer for acquiring information identifying the symbol sequence by using an intermediate state output from each of the divided hidden layers, and
the adjusting adjusts parameters of each of the hidden layers based on the acoustic-condition features corresponding to each hidden layer.

2. The speech recognition apparatus according to claim 1, wherein
the adjusting calculates a weighted sum as adjusted parameters by multiplying each parameters of each of the hidden layers by the acoustic-condition features adjusts parameters.

3. An acoustic model training apparatus configured to learn parameters of a neural network which transforms input speech data into information identifying a symbol sequence corresponding to the speech data, the apparatus comprising:
a memory; and
a processor coupled to the memory and programmed to execute a process comprising:
transforming training speech data into information identifying a symbol sequence by the neural network;
adjusting at least a part of parameters of the neural network based on input acoustic-condition features; and
updating each parameter of the neural network based on a result of a comparison between the information identifying the symbol sequence corresponding to training speech data obtained by the transformation of the training speech data using the neural network, in which the at least a part of parameters is adjusted by the adjusting, and a reference corresponding to the information identifying the symbol sequence,
wherein the neural network includes a same number of divided hidden layers as the number of the acoustic-condition features, and a layer for acquiring information identifying the symbol sequence by using an intermediate state output from each of the divided hidden layers, and
the adjusting adjusts parameters of each of the hidden layers based on the acoustic-condition features corresponding to each hidden layer.

4. The acoustic model training apparatus according to claim 3, wherein
the adjusting calculates a weighted sum as adjusted parameters by multiplying each parameters of each of the hidden layers by the acoustic-condition features.

5. A speech recognition method executed by a speech recognition apparatus, the method comprising:
transforming speech data to be recognized into information identifying a symbol sequence by a neural network; and
adjusting at least a part of parameters of the neural network based on input acoustic-condition features, wherein
the transforming transforms the speech data into the information identifying the symbol sequence by the neural network in which the at least a part of parameters is adjusted by the adjusting,
wherein the neural network includes a same number of divided hidden layers as the number of the acoustic-condition features, and a layer for acquiring information identifying the symbol sequence by using an intermediate state output from each of the divided hidden layers, and
the adjusting adjusts parameters of each of the hidden layers based on the acoustic-condition features corresponding to each hidden layer.

6. An acoustic model training method executed by an acoustic model training apparatus configured to learn parameters of a neural network which transforms input speech data into information identifying a symbol sequence corresponding to the speech data, the apparatus, the method comprising:
transforming training speech data into information identifying a symbol sequence by the neural network;
adjusting at least a part of parameters of the neural network based on input acoustic-condition features; and
updating each parameter of the neural network based on a result of a comparison between the information identifying the symbol sequence corresponding to training speech data obtained by the transformation of the training speech data using the neural network, in which the at least a part of parameters is adjusted by the adjusting, and a reference corresponding to the information identifying the symbol sequence,
wherein the neural network includes a same number of divided hidden layers as the number of the acoustic-condition features, and a layer for acquiring information identifying the symbol sequence by using an intermediate state output from each of the divided hidden layers, and
the adjusting adjusts parameters of each of the hidden layers based on the acoustic-condition features corresponding to each hidden layer.

7. A non-transitory computer-readable recording medium having stored a program for speech recognition that causes a computer to execute a process comprising:
transforming speech data to be recognized into information identifying a symbol sequence by a neural network, and
adjusting at least a part of parameters of the neural network based on input acoustic-condition features, wherein
the transforming transforms the speech data into the information identifying the symbol sequence by the neural network in which the at least a part of parameters is adjusted by the adjusting, wherein the neural network includes a same number of divided hidden layers as the number of the acoustic-condition features, and a layer for acquiring information identifying the symbol sequence by using an intermediate state output from each of the divided hidden layers, and the adjusting adjusts parameters of each of the hidden layers based on the acoustic-condition features corresponding to each hidden layer.

8. A non-transitory computer-readable recording medium having stored a program for training an acoustic model that causes a computer to execute a process comprising:

transforming the training speech data into information identifying a symbol sequence by the neural network;

adjusting at least a part of parameters of the neural network based on the input acoustic-condition features; and updating each parameter of the neural network based on a result of a comparison between the information identifying the symbol sequence corresponding to training speech data obtained by the transformation of the training speech data using the neural network, in which the at least a part of parameters is adjusted by the adjusting, and a reference corresponding to the information identifying the symbol sequence, wherein the neural network includes a same number of divided hidden layers as the number of the acoustic-condition features, and a layer for acquiring information identifying the symbol sequence by using an intermediate state output from each of the divided hidden layers, and the adjusting adjusts parameters of each of the hidden layers based on the acoustic-condition features corresponding to each hidden layer.

* * * * *